United States Patent
Yamamoto et al.

(10) Patent No.: US 12,177,832 B2
(45) Date of Patent: Dec. 24, 2024

(54) TERMINAL AND TRANSMISSION METHOD

(71) Applicant: Panasonic Intellectual Property Corporation of America, Torrance, CA (US)

(72) Inventors: Tetsuya Yamamoto, Kanagawa (JP); Ankit Bhamri, Hessen (DE); Hidetoshi Suzuki, Kanagawa (JP); Rikin Shah, Hessen (DE); Hongchao Li, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 258 days.

(21) Appl. No.: 17/625,072

(22) PCT Filed: Mar. 11, 2020

(86) PCT No.: PCT/JP2020/010653
§ 371 (c)(1),
(2) Date: Jan. 5, 2022

(87) PCT Pub. No.: WO2021/009967
PCT Pub. Date: Jan. 21, 2021

(65) Prior Publication Data
US 2022/0287057 A1  Sep. 8, 2022

(30) Foreign Application Priority Data
Jul. 12, 2019  (JP) ................. 2019-130424

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04L 5/0053* (2013.01); *H04W 72/23* (2023.01); *H04W 72/569* (2023.01)

(58) Field of Classification Search
None
See application file for complete search history.

(56) References Cited

U.S. PATENT DOCUMENTS

2014/0328304 A1   11/2014   Suzuki et al.
2015/0341864 A1   11/2015   Yang et al.
(Continued)

FOREIGN PATENT DOCUMENTS

JP    2013-110657 A    6/2013
JP    2016506199 A     2/2016
(Continued)

OTHER PUBLICATIONS

Extended European Search Report, dated Jun. 28, 2022, for European Patent Application No. 20841630.5-1215, 8 pages.
(Continued)

*Primary Examiner* — Lonnie V Sweet
(74) *Attorney, Agent, or Firm* — Seed IP Law Group LLP

(57) ABSTRACT

This terminal is provided with: a control circuit that, on the basis of information relating to the priority degrees of a plurality of uplink signals, determines at least one uplink signal to be transmitted in some transmission resource in a time domain among the plurality of uplink signals; and a transmission circuit that transmits the determined uplink signal in the transmission resource.

10 Claims, 22 Drawing Sheets

| Logical channel number | Priority | SR resource ID | SR priority |
|---|---|---|---|
| 1 | 1 | 0 | 1 |
| 2 | 2 | 0 | |
| 3 | 3 | 1 | 3 |
| 4 | 4 | 1 | |
| 5 | 5 | 1 | |
| 6 | 6 | 1 | |
| 7 | 7 | 1 | |
| 8 | 8 | 1 | |
| 9 | 9 | 2 | 9 |
| 10 | 9 | 2 | |
| 11 | 9 | 2 | |
| 12 | 10 | 2 | |
| 13 | 10 | 2 | |
| 14 | 10 | 2 | |
| 15 | 11 | 3 | 11 |
| 16 | 11 | 3 | |
| 17 | 12 | 4 | 12 |
| 18 | 12 | 4 | |
| 19 | 12 | 4 | |
| 20 | 12 | 4 | |
| 21 | 13 | 5 | 13 |
| 11 | 13 | 5 | |
| 23 | 14 | 6 | 14 |
| 24 | 14 | 6 | |
| 25 | 15 | 7 | 15 |
| 26 | 15 | 7 | |
| 27 | 15 | 7 | |
| 28 | 16 | 7 | 16 |
| 29 | 16 | 7 | |

(51) Int. Cl.
  *H04L 5/00* (2006.01)
  *H04W 72/23* (2023.01)
  *H04W 72/566* (2023.01)

(56) References Cited

U.S. PATENT DOCUMENTS

| | | | |
|---|---|---|---|
| 2018/0368167 A1 | 12/2018 | Kim et al. | |
| 2018/0368173 A1 | 12/2018 | Shaheen et al. | |
| 2019/0363843 A1* | 11/2019 | Gordaychik | H04L 1/08 |
| 2019/0387578 A1* | 12/2019 | Shrestha | H04W 72/21 |
| 2020/0008177 A1* | 1/2020 | Huang | H04L 5/0064 |
| 2020/0008227 A1* | 1/2020 | Lee | H04W 72/0446 |
| 2020/0367265 A1 | 11/2020 | Wang et al. | |
| 2022/0312437 A1 | 9/2022 | Behravan et al. | |

FOREIGN PATENT DOCUMENTS

| | | |
|---|---|---|
| WO | WO 2018174450 A1 | 9/2018 |
| WO | 2018/231728 A1 | 12/2018 |

OTHER PUBLICATIONS

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Multiplexing and channel coding (Release 15)," 3GPP TS 38.212 V15.6.0, Jun. 2019. (101 pages).

3GPP, "3rd Generation Partnership Project; Technical Specification Group Radio Access Network; NR; Physical layer procedures for control (Release 15)," 3GPP TS 38.213 V15.6.0, Jun. 2019. (107 pages).

3GPP, "3rd Generation Partnership Project; Technical Specification Group Radio Access Network; NR; Medium Access Control (MAC) protocol specification (Release 15)," 3GPP TS 38.321 V15.6.0, Section 5.4.3, pp. 30-32, Jun. 2019.

3GPP, "3rd Generation Partnership Project; Technical Specification Group Radio Access Network; NR; Medium Access Control (MAC) protocol specification (Release 15)," 3GPP TS 38.321 V15.6.0, Jun. 2019. (78 pages).

3GPP, "3rd Generation Partnership Project; Technical Specification Group Radio Access Network; NR; Radio Resource Control (RRC) protocol specification (Release 15)," 3GPP TS 38.331 V15.6.0, Jun. 2019. (519 pages).

Huawei, HiSilicon, "Discussion on partial overlap between PUCCHs [online]," R1-1804427, Agenda Item: 7.1.3.2.5, 3GPP TSG RAN WG1 Meeting #92bis, Sanya, China, Apr. 16-20, 2018, 11 pages.

Huawei, HiSilicon, "New WID: Physical Layer Enhancements for NR Ultra-Reliable and Low Latency Communication (URLLC)," RP-190726, Agenda Item: 9.1.1, 3GPP TSG RAN Meeting #83, Shenzhen, China, Mar. 18-21, 2019, 5 pages.

International Search Report, mailed Jun. 2, 2020, for International Application No. PCT/JP2020/010653, 7 pages. (with English Translation).

Nokia, Nokia Shanghai Bell, "New WID: Support of NR Industrial Internet of Things (IoT)," RP-190728, Agenda Item: 9.1.2., 3GPP TSG RAN Meeting #83, Shenzhen, China, Mar. 18-21, 2019, 6 pages.

Nokia, Nokia Shanghai Bell, "Summary of offline discussions on UL/DL intra-UE prioritization/multiplexing [online]," R1-1901428, Agenda Item: 7.2.6.4, 3GPP TSG-RAN WG1 Ad-Hoc Meeting 1901, Taipei, Taiwan, Jan. 21-25, 2019, 23 pages.

Panasonic, "Discussion on scheduling/HARQ enhancement for URLLC," R1-1905094, Agenda Item: 7.2.6.4, 3GPP TSG RAN WG1 #96bis, Xi'an, China, Apr. 8-12, 2019, 5 pages.

Panasonic, "Discussion on UCI enhancement for URLLC," R1-1905092, Agenda Item: 7.2.6.2, 3GPP TSG RAN WG1 #96bis, Xi'an, China, Apr. 8-12, 2019, 5 pages.

Panasonic, "On inter UE Tx prioritization/multiplexing enhancements for Nr URLLC," R1-1907030, Agenda Item: 7.2.6.5, 3GPP TSG RAN WG1 #97, Reno, USA, May 13-17, 2019, 6 pages.

Samsung, "Discussion on intra-UE multiplexing/prioritization," R1-1901272, Agenda Item: 7.2.6.4, 3GPP TSG RAN WG1 Ad-Hoc Meeting 1901, Taipei, Taiwan, Jan. 21-25, 2019, 7 pages.

Ericsson, "Introduction of NR IIoT," R2-2002359, Change Request 38.331 CR 1498 rev 1 Current version: 15.8.0, 3GPP TSG RAN WG2#109e, Electronic meeting, Feb. 24-Mar. 6, 2020, 34 pages.

Interdigital, Inc., "On UCI enhancements for URLLC," R1-1904883, Agenda Item: 7.2.6.2, 3GPP TSG RAN WG1 #96bis, Xi'an, China, Apr. 8-12, 2019, 5 pages.

InterDigital Inc., "UCI Enhancements for eURLLC," R1-1907194, Agenda Item: 7.2.6.2, 3GPP TSG RAN WG1 #97, Reno, USA, Apr. 13-17, 2019, 6 pages.

Nokia et al., "On UCI Enhancements for NR URLLC," R1-1906752, Agenda Item: 7.2.6.2, 3GPP TSG RAN WG1#97, Reno, Nevada, US, May 13-17, 2019, 14 pages.

Oppo, "Summary on UCI enhancements for URLLC," R1-1907683, Agenda Item: 7.2.6.2, 3GPP TSG RAN WG1 #97, Reno, USA, May 13-17, 2019, 18 pages.

Oppo, "Summary#2 on UCI enhancements for URLLC," R1-1907777, Agenda Item: 7.2.6.2, 3GPP TSG RAN WG1 #97, Reno, USA, May 13-17, 2019, 20 pages.

Samsung, "Corrections on Ultra Reliable Low Latency Communications Enhancements," R1-2007471, Change Request 38.213 CR 0139 Current version: 16.2.0, 3GPP TSG-RAN WG1 Meeting #102-e, e-Meeting, Aug. 17-28, 2020, 21 pages.

Samsung, "Introduction of Ultra Reliable Low Latency Communications Enhancements," RP-193125, Change Request 38.213 CR 0074 rev 1 Current version: 15.7.0, 3GPP TSG RAN Meeting #86, Sitges, Spain, Dec. 9-12, 2019, 46 pages.

* cited by examiner

|  | URLLC SR | URLLC ACK/NACK | CSI | URLLC PUSCH | eMBB SR | eMBB ACK/NACK | eMBB PUSCH |
|---|---|---|---|---|---|---|---|
| URLLC SR | ▓ | ▓ | ▓ | ▓ | ▓ | ▓ | ▓ |
| URLLC ACK/NACK |  | ▓ | ▓ | ▓ | ▓ | ▓ | ▓ |
| CSI |  |  | ▓ | ▓ | ▓ | ▓ | ▓ |
| URLLC PUSCH |  |  |  | ▓ | ▓ | ▓ | ▓ |
| eMBB SR |  |  |  |  | ▓ | ▓ | ▓ |
| eMBB ACK/NACK |  |  |  |  |  | ▓ | ▓ |
| eMBB PUSCH |  |  |  |  |  |  | ▓ |

FIG. 1

| Logical channel priority | SR priority in PHY |
|---|---|
| 1 | 1 |
| 2 | 1 |
| 3 | 1 |
| 4 | 1 |
| 5 | 2 |
| 6 | 2 |
| 7 | 2 |
| 8 | 2 |
| 9 | 3 |
| 10 | 3 |
| 11 | 3 |
| 12 | 3 |
| 13 | 4 |
| 14 | 4 |
| 15 | 4 |
| 16 | 4 |

FIG. 8

| Logical channel number | Priority | SR resource ID |
|---|---|---|
| 1 | 1 | 0 |
| 2 | 2 | 1 |
| 3 | 3 | 2 |
| 4 | 4 | 3 |
| 5 | 5 | 4 |
| 6 | 6 | 5 |
| 7 | 7 | 6 |
| 8 | 8 | 7 |

FIG. 9

| Logical channel number | Priority | SR resource ID | SR priority |
|---|---|---|---|
| 1 | 1 | 0 | 1 |
| 2 | 2 | 0 | |
| 3 | 3 | 1 | 3 |
| 4 | 4 | 1 | |
| 5 | 5 | 1 | |
| 6 | 6 | 1 | |
| 7 | 7 | 1 | |
| 8 | 8 | 1 | |
| 9 | 9 | 2 | 9 |
| 10 | 9 | 2 | |
| 11 | 9 | 2 | |
| 12 | 10 | 2 | |
| 13 | 10 | 2 | |
| 14 | 10 | 2 | |
| 15 | 11 | 3 | 11 |
| 16 | 11 | 3 | |
| 17 | 12 | 4 | 12 |
| 18 | 12 | 4 | |
| 19 | 12 | 4 | |
| 20 | 12 | 4 | |
| 21 | 13 | 5 | 13 |
| 11 | 13 | 5 | |
| 23 | 14 | 6 | 14 |
| 24 | 14 | 6 | |
| 25 | 15 | 7 | 15 |
| 26 | 15 | 7 | |
| 27 | 15 | 7 | |
| 28 | 16 | 7 | 16 |
| 29 | 16 | 7 | |

FIG. 10

```
-- ASN1START
-- TAG-SCHEDULINGREQUESTID-START

SchedulingRequestId ::=      INTEGER (0 .. 7)
Priority ::=                 INTEGER (1 .. 16)

-- TAG SCHEDULINGREQUESTID-STOP
-- ASN1STOP
```

FIG. 11

| Logical channel number | Configuration 1 | Configuration 2 |
|---|---|---|
| Priority indicator "0" | Logical channel priority 1 | Logical channel priority 8 |
| Priority indicator "1" | Logical channel priority 10 | Logical channel priority 16 |

FIG. 14

| Logical channel priority | | |
|---|---|---|
| 1 | Priority set 1 | Higher priority than any ACK/NACK |
| 2 | Priority set 2 | Same priority as the ACK/NACK indicated by priority indicator "0" |
| 3 | | |
| 4 | | |
| 5 | | |
| 6 | | |
| 7 | | |
| 8 | Priority set 3 | Same priority as the ACK/NACK indicated by priority indicator "1" |
| 9 | | |
| 10 | | |
| 11 | | |
| 12 | | |
| 13 | | |
| 14 | | |
| 15 | | |
| 16 | Priority set 4 | Lower priorioty than any ACK/NACK |

FIG. 15

| Logical channel priority | | |
|---|---|---|
| 1 | Priority set 1 | Higher priority than CSI |
| 2 | | |
| 3 | | |
| 4 | | |
| 5 | | |
| 6 | | |
| 7 | | |
| 8 | Priority set 2 | Same priority as CSI |
| 9 | | |
| 10 | | |
| 11 | | |
| 12 | | |
| 13 | | |
| 14 | | |
| 15 | | |
| 16 | Priority set 3 | Lower priority than CSI |

FIG. 18

TERMINAL AND TRANSMISSION METHOD

TECHNICAL FIELD

The present disclosure relates to a terminal and a transmission method.

BACKGROUND ART

In 3rd Generation Partnership Project (3GPP), the specification for Release 15 New Radio access technology (NR) has been completed for realization of 5th Generation mobile communication systems (5G). NR supports functions for realizing Ultra Reliable and Low Latency Communication (URLLC) in conjunction with high speed and high capacity that are basic requirements for enhanced Mobile Broadband (eMBB).

CITATION LIST

Non-Patent Literature

NPL 1
RP-190726, "New WID: Physical Layer Enhancements for NR Ultra-Reliable and Low Latency Communication (URLLC)," Huawei, HiSilicon, RAN #83

NPL 2
RP-190728, "New WID: Support of NR Industrial Internet of Things (IoT)," Nokia, Nokia Shanghai Bell, RAN #83

NPL 3
3GPP TS38.211 V15.6.0, "3GPP TSG-RAN NR Physical channels and modulation (Release 15)," June 2019.

NPL 4
3GPP TS38.212 V15.6.0, "3GPP TSG-RAN NR Multiplexing and channel coding (Release 15)," June 2019.

NPL 5
3GPP TS38.213 V15.6.0. "3GPP TSG-RAN NR Physical layer procedures for control (Release 15)," June 2019.

NPL 6
3GPP TS38.321 V15.6.0, "3GPP TSG-RAN NR Medium Access Control (MAC) protocol specification (Release 15)," June 2019.

NPL 7
3GPP TS38.331 V15.6.0, 3GPP TSG-RAN NR Radio Resource Control (RRC) protocol specification (Release 15)," June 2019.

NPL 8
R1-1905092, "Discussion on UCI enhancement for URLLC," Panasonic, RAN1 #96bis, April 2019

NPL 9
R1-1905094, "Discussion on scheduling/HARQ enhancement for URLLC," Panasonic, RAN1 #96bis, April 2019

NPL 10
R1-1907030, "On inter UE Tx prioritization/multiplexing enhancements for NR URLLC," Panasonic, RAN1 #97, May 2019.

SUMMARY OF INVENTION

However, there is scope for further study on appropriate radio communication processing according to requirements.

One non-limiting exemplary embodiment of the present disclosure facilitates providing a terminal and a transmission method capable of realizing appropriate radio communication processing according to requirements.

A terminal according to an exemplary embodiment of the present disclosure includes: control circuitry, which, in operation, determines at least one of a plurality of uplink signals which is to be transmitted on a transmission resource in a time domain, the at least one uplink signal being determined based on information on a priority of each of the plurality of uplink signals; and transmission circuitry, which, in operation, transmits the determined at least one uplink signal on the transmission resource.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to realize appropriate radio communication processing according to requirements.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 illustrates an example of combinations of uplink signals in a scenario in which transmission resources overlap each other in uplink transmission;

FIG. 8 illustrates an example of association between logical channel priorities and scheduling request (SR) priorities in the PHY layer;

FIG. 9 illustrates an example of association among logical channels, logical channel priorities, and SR resource IDs;

FIG. 10 illustrates an example of association among logical channels, logical channel priorities, and SR resource IDs, and, SR priorities;

FIG. 11 illustrates an example of SchedulingRequestId IE;

FIG. 14 illustrates association between priority indicators and logical channel priorities;

FIG. 15 illustrates association between priority indicators and logical channel priorities;

FIG. 18 illustrates an example of association between logical channel priorities and channel state information (CSI) priorities;

DESCRIPTION OF EMBODIMENTS

Figure 2:
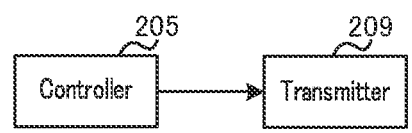
FIG. 2 is a block diagram illustrating an exemplary configuration of a part of a terminal.

Hereinafter, embodiments of the present disclosure will be described in detail with reference to the accompanying drawings.

In NR, it is assumed that a terminal (also referred to as User Equipment (UE)) supports services (e.g., eMBB and URLLC) having a plurality of different requirements. For example, in uplink transmission of the terminal, transmission resources (in other words, uplink resources or transmission periods) for services having different requirements may overlap (or collide with) each other in the time domain (see, e.g., Non-Patent Literatures (hereinafter, referred to as "NPLs") 1 and 2).

Cases (e.g., also referred to as scenarios) where the transmission resources corresponding to the services having different requirements overlap each other in the time domain in the terminal will be described below.

<Scenario 1: UL Control/Control Resource Collision>

For example, the terminal transmits Uplink Control Information (UCI) to a base station (also called gNB) using an uplink control channel (e.g., Physical Uplink Control Channel (PUCCH)). The UCI includes, for example, a response signal (referred to, e.g., as Acknowledgement/Negative Acknowledgement (ACK/NACK), or HARQ-ACK) indicating an error detection result for downlink data (e.g., Physical Downlink Shared Channel (PDSCH)), channel state information on a downlink channel state (e.g., Channel State Information (CSI)), and an uplink radio resource assignment request (e.g., Scheduling Request (SR)).

The terminal can also transmit, for example, the CSI using an uplink data channel (e.g., Physical Uplink Shared Channel (PUSCH)).

In Scenario 1, UCIs for respective services having a plurality of different requirements may occur in the terminal at the same timing (e.g., simultaneously). In this case, resources assigned for the UCIs for the respective services having different requirements may overlap each other in the time domain.

<Scenario 2: UL Data/Control Resource Collision>

The terminal transmits uplink data to the base station using, for example, a PUSCH.

In Scenario 2, uplink data and UCI with respect to the services having a plurality of different requirements may occur in the terminal at the same timing (e.g., simultaneously). In this case, a resource assigned for the uplink data and a resource assigned for the UCI may overlap each other in the time domain.

<Scenario 3: UL Data/Data Resource Collision>

The terminal transmits uplink data to the base station using, for example, a PUSCH.

In Scenario 3, pieces of uplink data for respective services having a plurality of different requirements may occur in the terminal at the same timing (e.g., simultaneously). In this case, resources assigned for the pieces of uplink data for the respective services having different requirements may overlap each other in the time domain.

Scenarios 1 to 3 have been described above.

FIG. 1 illustrates an example of combinations of uplink signals (e.g., 21 combinations that are not hatched in FIG. 1) in the scenarios (e.g., including Scenarios 1 to 3) in which overlap between transmission resources occurs in the uplink. Note that, FIG. 1 illustrates two services (e.g., URLLC and eMBB) as examples of the services having different requirements.

In the scenarios described above, when the terminal has the capability to transmit signals of a plurality of channels simultaneously (e.g., in the case of simultaneous transmission of a plurality of PUCCHs or PUSCHs, or in the case of transmission of both a PUCCH and a PUSCH), it may happen that the terminal transmits signals for services having different requirements simultaneously without considering influences to each other.

On the other hand, when the terminal does not have the capability to transmit signals of a plurality of channels simultaneously, the terminal transmits a signal of a part of the plurality of channels (either one of the channels in the case of the above-described scenarios) but does not transmit a signal of the other channels (in other words, not transmitting is referred to as dropping or non-transmission). Alternatively, the terminal controls the transmission power for a plurality of channels.

Terminal operations performed in the case where the terminal does not have the capability to transmit signals of a plurality of channels simultaneously need to be further studied. For example, there is scope for further study on a terminal operation based on priorities (also referred to as priority levels) for determining which uplink signal (e.g., uplink data or UCI) the terminal transmits.

Hereinafter, by way of example, the operation of the terminal in the case where a plurality of uplink transmissions in NR Release 15 overlap one another in the time domain will be described (see, for example, NPL 3).

[1]: Case where a PUCCH Resource on which the Terminal Transmits an SR and a PUCCH Resource on which the Terminal Transmits ACK/NACK Overlap Each Other in the Time Domain

<1-1>

The terminal multiplexes and transmits the ACK/NACK and the SR in the PUCCH, for example, when the PUCCH resource configured for the terminal to transmit the ACK/NACK using PUCCH format 0 and the PUCCH resource configured for the terminal to transmit the SR overlap each other in the time domain.

At this time, a PUCCH resource on which the ACK/NACK and the SR are multiplexed is determined, for example, based on the PUCCH resource assigned for transmitting the ACK/NACK (see, for example, NPL 3 or 5).

<1-2>

The terminal multiplexes and transmits the ACK/NACK and the SR in the PUCCH, for example, when the format of the PUCCH resource configured for the terminal to transmit the SR is PUCCH format 1 and when the PUCCH resource configured for the terminal to transmit the ACK/NACK using PUCCH format 1 and the PUCCH resource configured for the terminal to transmit the SR overlap each other in the time domain.

At this time, the terminal transmits the ACK/NACK using the PUCCH assigned for the SR, for example, in the case of positive SR (in other words, in the case where the SR is present). On the other hand, the terminal transmits the ACK/NACK using the PUCCH assigned for the ACK/

NACK, for example, in the case of negative SR (in other words, in the case where the SR is absent). In this case, the base station judges the presence or absence of SR (in other words, either one of the positive SR and the negative SR) based on the PUCCH resource on which the ACK/NACK is actually transmitted (see, for example, NPL 5).

<1-3>

The terminal drops the SR transmission and transmits the ACK/NACK using the PUCCH resource assigned for the ACK/NACK, for example, when the format of the PUCCH resource configured for the terminal to transmit the SR is PUCCH format 0 and when the PUCCH resource configured for the terminal to transmit the ACK/NACK using PUCCH format 1 and the PUCCH resource configured for the terminal to transmit the SR overlap each other in the time domain (e.g., see NPL 5).

<1-4>

The terminal multiplexes and transmits the ACK/NACK and the SR in the PUCCH, for example, when the PUCCH resource configured for transmission of the ACK/NACK using PUCCH format 2, 3, or 4 and the PUCCH resource configured for transmission of the SR overlap each other in the time domain.

At this time, a PUCCH resource on which the ACK/NACK and SRS are multiplexed is determined, for example, based on the PUCCH assigned for transmitting the ACK/NACK. Further, for example, the terminal transmits, in the PUCCH, a bit sequence formed from an ACK/NACK bit sequence and a bit sequence indicative of the presence or absence of the SR that is added to the end of the ACK/NACK bit sequence (see, for example, NPL 4 or 5).

[2]: Case where a PUCCH Resource on which the Terminal Transmits an SR and a PUCCH Resource on which the Terminal Transmits CSI Overlap Each Other in the Time Domain The terminal, for example, multiplexes and transmits the CSI and the SR in a PUCCH.

At this time, a PUCCH resource on which the CSI and the SR are multiplexed is determined based on, for example, the PUCCH resource assigned for transmission of the CSI. Further, for example, the terminal transmits, in the PUCCH, a bit sequence formed from a CSI bit sequence and a bit sequence indicative of the presence or absence of the SR that is added to the front of the CSI bit sequence (see, for example, NPL 4 or 5).

[3]. Case where a PUCCH Resource on which the Terminal Transmits ACK/NACK and a PUCCH Resource on which the Terminal Transmits CSI Overlap Each Other in the Time Domain For example, by the parameter "simultaneousHARQ-ACK-CSI" of a higher layer, the terminal is configured in advance with possibility or impossibility of simultaneous transmission of the ACK/NACK and the CSI. When "simultaneousHARQ-ACK-CSI" configures the possibility of simultaneous transmission of the ACK/NACK and the CSI, the terminal multiplexes and transmits, for example, the ACK/NACK and the CSI in the PUCCH. At this time, a PUCCH resource on which the ACK/NACK and the CSI are multiplexed is determined, for example, based on the PUCCH assigned for transmitting the ACK/NACK.

On the other hand, when "simultaneousHARQ-ACK-CSI" configures the impossibility of simultaneous transmission of the ACK/NACK and the CSI, or when "simultaneousHARQ-ACK-CSI" is not configured, the terminal, for example, drops CSI transmission and transmits the ACK/NACK using the PUCCH assigned for the ACK/NACK (see, for example, NPL 5).

[4]: Case where a PUCCH Resource on which the Terminal Transmits an SR and a PUSCH Resource on which the Terminal Transmits Uplink Data Overlap Each Other in the Time Domain For example, the terminal drops SR transmission and transmits the uplink data (see, for example, NPL 5).

[5]: Case where a PUCCH Resource on which the Terminal Transmits ACK/NACK or CSI and a PUSCH Resource on which the Terminal Transmits Uplink Data Overlap Each Other in the Time Domain The terminal multiplexes and transmits, for example, the ACK/NACK or CSI and the uplink data in the PUSCH.

At this time, the PUSCH in which the ACK/NACK or CSI and the uplink data are multiplexed is determined based on the PUSCH resource assigned for transmitting the uplink data (see, for example, NPL 5).

The operations of the terminal when a plurality of uplink transmissions in NR Release 15 overlap one another in the time domain have been described.

In respect of the terminal operations in NR Release 15 described above, terminal operations with respect to uplink signals having different requirements have not been studied comprehensively.

For example, in the terminal operation <1-3> described above, an occasion of transmitting an SR for URLLC traffic requiring high reliability or low latency in PUCCH format 0 may be overlapped in the time domain by a resource of PUCCH format 1 for transmitting ACK/NACK for eMBB traffic having a lower priority than URLLC traffic. In this case, according to the terminal operation <1-3> described above, the terminal drops the SR for URLLC traffic (in other words, does not transmit the SR). Thus, the terminal transmits the SR on the next transmission occasion. Accordingly, an increase in latency may be caused in URLLC requiring low latency.

In addition, in the terminal operation [4] described above, an occasion of transmitting the SR for URLLC traffic may be overlapped in the time domain by a PUSCH for transmitting uplink data of eMBB traffic. In this case, according to the terminal operation <4> described above, the terminal drops the SR for URLLC traffic (in other words, does not transmit the SR). Thus, the terminal transmits the SR on the next transmission occasion. Accordingly, an increase in latency may be caused in URLLC requiring low latency.

As is understood, in the terminal operations in NR Release 15, an increase in latency may be caused in uplink signals having different requirements as a result of not transmitting a signal (e.g., SR) for URLLC traffic requiring high reliability or low latency, for example.

Further, for example, when the terminal multiplexes and transmits a plurality of UCIs in a PUCCH, or when the UCIs are multiplexed and transmitted in a PUSCH, the terminal can collectively transmit the UCIs and the uplink data on resources overlapping each other in the time domain. At this time, for example, the terminal may multiplex and transmit the UCIs for URLLC traffic requiring high reliability or low latency in a PUCCH or PUSCH for eMBB traffic having a lower priority than the URLLC traffic. In this case, it is probable that resources and radio parameters assigned for the PUCCH or PUSCH in which the UCIs are multiplexed do not satisfy the URLLC requirements.

In addition, for example, when the terminal multiplexes and transmits UCIs for eMBB traffic in the PUCCH or PUSCH for URLLC traffic requiring high reliability or low latency, the transmission properties of the PUCCH or PUSCH for URLLC traffic may degrade due to an increased number of transmission bits caused by multiplexing of the UCIs for eMBB traffic.

In view of the above, one exemplary embodiment of the present disclosure will be described in relation to the operation of the terminal performed in the case where channels corresponding to services having different requirements overlap each other in the time domain.

For example, in one exemplary embodiment of the present disclosure, in a scenario in which transmissions of uplink signals (e.g., UCI or uplink data) having different requirements overlap each other in the time domain, the terminal determines the priorities of the uplink signals, and transmits at least one of the UCI and the uplink data based on the priorities.

For example, the terminal determines a priority of the UCI or uplink data in the physical (PHY) layer. For example, when transmissions of uplink signals overlap each other in the time domain, the terminal compares the priorities of UCIs or pieces of uplink data in the PHY layer (also referred to as a physical layer) and preferentially transmits UCI or uplink data having a higher priority. Alternatively, the terminal may multiplex and transmit the UCI having a lower priority in an uplink channel (e.g., PUCCH or PUSCH) for transmitting the uplink signal having a higher priority.

According to one exemplary embodiment of the present disclosure, it is possible for the terminal to transmit the UCI or uplink data while suppressing an increase in latency and a deterioration in transmission properties, for example, even when an uplink resource for transmitting an uplink signal having a higher priority, such as for URLLC, and an uplink resource for transmitting an uplink signal having a lower priority, such as for eMBB, overlap each other in the time domain.

Hereinafter, an exemplary embodiment of the present disclosure will be described in detail.

[Overview of Communication System]

A communication system according to an exemplary embodiment of the present disclosure includes base station 100 and terminal 200.

FIG. 2 is a block diagram illustrating a configuration example of a part of terminal 200 according to an exemplary embodiment of the present disclosure. In terminal 200 illustrated in FIG. 2, controller 205 (e.g., corresponding to the control circuitry) determines the priority of each of a first uplink signal and a second uplink signal between which assigned resources overlap each other in the time domain. Transmitter 209 (e.g., corresponding to the transmission circuitry) transmits at least one of the first uplink signal and the second uplink signal based on the priorities.

[Configuration of Base Station]

Figure 3:
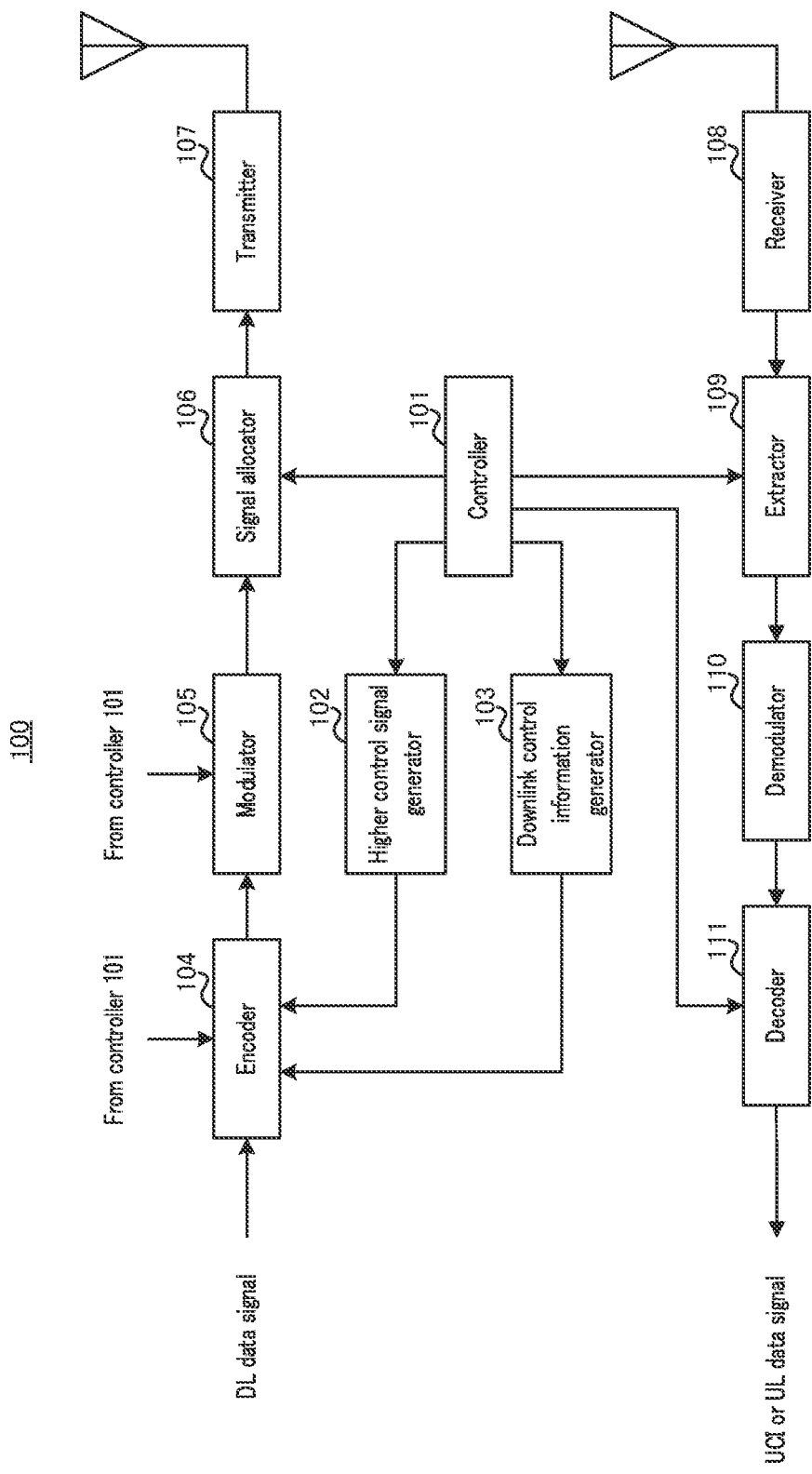
FIG. 3 is a block diagram illustrating an exemplary configuration of a base station.

FIG. 3 is a block diagram illustrating a configuration example of base station 100 according to an exemplary embodiment of the present disclosure. In FIG. 3, base station 100 includes controller 101, higher control signal generator 102, downlink control information generator 103, encoder 104, modulator 105, signal allocator 106, transmitter 107, receiver 108, extractor 109, demodulator 110, and decoder 111.

For example, controller 101 determines configuration information (e.g., referred to as Radio Resource Control (RRC) configuration information) including higher layer parameters for terminal 200, and outputs the determined RRC configuration information to higher control signal generator 102 and extractor 109.

The RRC configuration information may include, for example, information on configuration of a logical channel (hereinafter, referred to as "logical channel configuration information"), information on configuration of an SR resource (hereinafter, referred to as "SR resource configuration information"), information for receiving DCI, information on configuration of ACK/NACK transmission (hereinafter, referred to as "ACK/NACK transmission configuration information"), information on configuration of CSI transmission (hereinafter, referred to as "CSI transmission configuration information"), and information on configuration of PUSCH transmission (hereinafter, referred to as "PUSCH transmission configuration information").

Further, the RRC configuration information may include, for example, information for determining the priorities of uplink signals (e.g., UCI and uplink data) in the PHY layer. The information for determining the priorities of the uplink signals may include, for example, information on association between the priorities of logical channels (also referred to as "logical channel priorities") and the priorities of the uplink signals in the PHY layer, which will be described later.

In addition, controller 101 determines information on a downlink signal for transmission of downlink data (e.g., PDSCH), a higher control signal, or downlink control information (e.g., DCI). The information on the downlink signal may include, for example, information such as a Modulation and Coding Scheme (MCS) and radio resource allocation. Controller 101 outputs, for example, the determined information to encoder 104, modulator 105, and signal allocator 106. Further, controller 101 outputs the information on the downlink signal to downlink control information generator 103.

In addition, controller 101 determines information for terminal 200 to transmit ACK/NACK for downlink data, and outputs the determined information to downlink control information generator 103 and extractor 109. The information for transmission of the ACK/NACK may include, for example, information on a PUCCH resource. The information for transmission of the ACK/NACK may also include, for example, information for determining the priority of ACK/NACK (also referred to as "ACK/NACK priority") in the PHY layer, which will be described later.

Further, for example, controller 101 may determine information for terminal 200 to transmit CSI, and output the determined information to downlink control information generator 103 and extractor 109. The information for transmission of the CSI may include, for example, a flag for triggering CSI transmission or information on a PUSCH resource.

In addition, controller 101 determines information for terminal 200 to transmit uplink data, and outputs the determined information to downlink control information generator 103, extractor 109, and decoder 111. The information for transmission of the uplink data may include, for example, a modulation and coding scheme and radio resource allocation.

Higher control signal generator 102 generates a higher layer control signal bit sequence based on the information inputted from controller 101 (e.g., based on the RRC configuration information), and outputs the higher layer control signal bit sequence to encoder 104.

Downlink control information generator 103 generates a downlink control information (e.g., DCI) bit sequence based on the information inputted from controller 101, and outputs the generated DCI bit sequence to encoder 104. Note that, the control information may be transmitted to a plurality of terminals. For this reason, downlink control information generator 103 may scramble the PDCCH transmitting the DCI by UE-specific identification information. The UE-specific identification information may, for example, be information such as any of a Cell Radio Network Temporary Identifier (C-RNTI), a Modulation and Coding Scheme C-RNTI (MCS-C-RNTI), and a RNTI introduced for URLLC, and may be other information (e.g., another RNTI).

Based on the information inputted from controller 101 (e.g., information on a coding rate), encoder 104 encodes, for example, the downlink data (also referred to as "downlink UP data," for example), the bit sequence inputted from higher control signal generator 102, or the DCI bit sequence inputted from downlink control information generator 103. Encoder 104 outputs the encoded bit sequence to modulator 105.

Modulator 105 modulates the encoded bit sequence inputted from encoder 104, for example, based on the information inputted from controller 101 (e.g., information on a modulation scheme), and outputs the modulated signal (e.g., symbol sequence) to signal allocator 106.

Signal allocator 106 maps the symbol sequence inputted from modulator 105 (e.g., including the downlink data or control signal) to radio resources based on the information inputted from controller 101 that indicates the radio resources. Signal allocator 106 outputs, to transmitter 107, a downlink signal in which a signal is mapped.

Transmitter 107 performs transmission waveform generation processing such as, for example, Orthogonal Frequency Division Multiplexing (OFDM) on the signal inputted from signal allocator 106. Further, transmitter 107 performs Inverse Fast Fourier Transform (IFFT) processing on the signal in the case of OFDM transmission with addition of a cyclic prefix (CP), and adds a CP to the signal subjected to IFFT. Further, transmitter 107 performs RF processing such as D/A conversion and up-conversion on the signal, and transmits a radio signal to terminal 200 via an antenna.

Receiver 108 performs RF processing such as down-conversion or A/D conversion on an uplink signal from terminal 200 received via the antenna. Further, in the case of OFDM transmission, receiver 108 performs Fast Fourier Transform (FFT) processing on the received signal, and outputs a resulting frequency-domain signal to extractor 109.

Extractor 109 determines information on the uplink signal transmitted by terminal 200 (e.g., information on an uplink signal having a higher priority) based on the information inputted from controller 101. Based on the determined information, extractor 109 extracts, from the received signal inputted from receiver 108, a radio resource portion, for example, by which UCI or uplink data or both of them are transmitted, and outputs the extracted radio resource portion to demodulator 110.

Demodulator 110 demodulates at least one of the UCI and the uplink data based on the signal (radio resource portion) inputted from extractor 109, and outputs the demodulation result to decoder 111.

Decoder 111 performs error correction decoding on at least one of the UCI and the uplink data based on the information inputted from controller 101 and the demodulation result inputted from demodulator 110 to obtain a received bit sequence resulting from decoding. Note that, decoder 111 does not have to perform the error correction decoding on the UCI which is transmitted without error correction coding being performed thereon.

[Configuration of Terminal]

Figure 4:
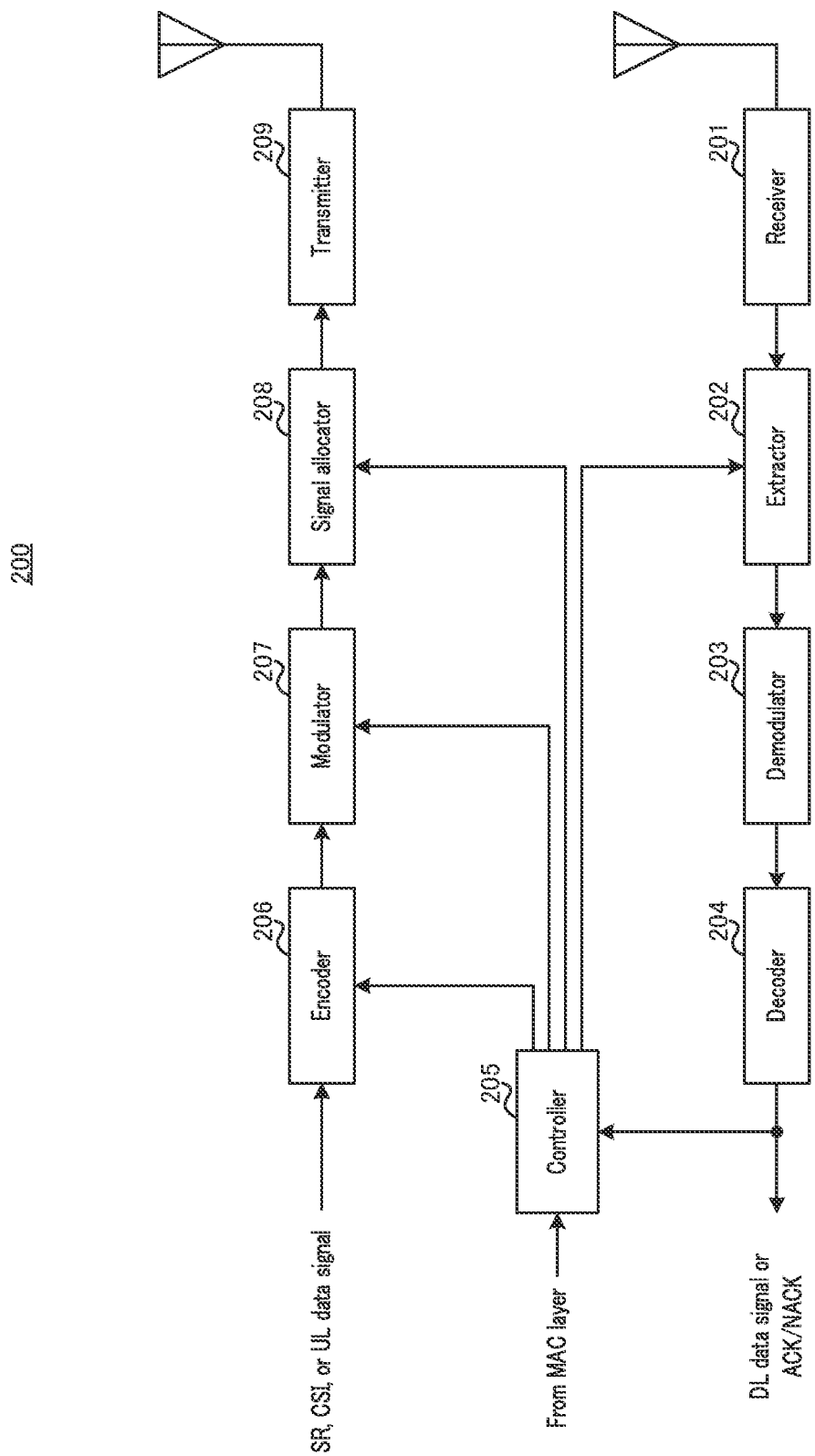
FIG. 4 is a block diagram illustrating an exemplary configuration of the terminal.

FIG. 4 is a block diagram illustrating a configuration example of terminal 200 according to an exemplary embodiment of the present disclosure. For example, the configuration of terminal 200 illustrated in FIG. 4 is an example of the configuration of the PHY layer. In FIG. 4, terminal 200 includes receiver 201, extractor 202, demodulator 203, decoder 204, controller 205, encoder 206, modulator 207, signal allocator 208, and transmitter 209.

Receiver 201 receives a downlink signal (e.g., downlink data or downlink control information) from base station 100 via an antenna, and performs RF processing such as down-conversion or A/D conversion on a radio received signal to obtain a received signal (baseband signal). Further, when receiving an OFDM signal, receiver 201 performs the FFT processing on the received signal, and converts the received signal into a frequency domain. Receiver 201 outputs the received signal to extractor 202.

Extractor 202 extracts, from the received signal inputted from receiver 201, a radio resource portion that may include the downlink control information, based on information on a radio resource in the downlink control information inputted from controller 205, and outputs the extracted radio resource portion to demodulator 203. Further, extractor 202 extracts a radio resource portion including the downlink data based on information on a radio resource for the data signal inputted from controller 205, and outputs the radio resource portion to demodulator 203.

Demodulator 203 demodulates the signal inputted from extractor 202 and outputs the demodulation result to decoder 204.

Decoder 204 performs error correction decoding on the demodulation result inputted from demodulator 203, and obtains, for example, downlink received data, a higher layer control signal, or downlink control information. Decoder 204 outputs the higher layer control signal and downlink control information to controller 205, and outputs the downlink received data. In addition, decoder 204 may generate ACK/NACK based on the decoding result for the downlink received data. The ACK/NACK may be outputted to encoder 206, for example.

Controller 205 determines, for example, the priorities of uplink signals (e.g., UCI and uplink data) in the PHY layer. Controller 205 may determine the priorities of the uplink signals based on, for example, at least one of information on the priorities of the uplink signals obtained from the MAC layer (sometimes referred to as MAC entity), information on the priorities of the uplink signals included in the higher layer control signal inputted from decoder 204, and information on the priorities of the uplink signals (e.g., ACK/NACK) indicated in the downlink control information. Hereinafter, processing (or operation) of determining the priorities of the uplink signals may be referred to as "terminal operation 1," for example.

Further, when transmissions of a plurality of uplink signals (in other words, transmission resources or transmission periods) overlap one another in the time domain, controller 205 compares the priorities of the plurality of uplink signals, for example, and determines the priorities of the plurality of uplink signals based on the comparison result (hereinafter, also referred to as "terminal operation 2"). In addition, controller 205 determines an uplink signal to be actually transmitted based on the priorities of the plurality of uplink signals (hereinafter sometimes referred to as "terminal operation 3"). Controller 205 outputs the determined result, for example, to encoder 206, modulator 207 and signal allocator 208.

Note that, examples of terminal operation 1, terminal operation 2, and terminal operation 3 of terminal 200 will be described later.

Further, controller 205 may output, for example, information included in the higher layer control signal to the MAC layer. The information outputted to the MAC layer may include, for example, the RRC configuration information and downlink control information.

Further, controller 205 determines information on transmission of an uplink signal and outputs the determined information to encoder 206 and signal allocator 208. Further, controller 205 determines information on reception of a downlink signal and outputs the determined information to extractor 202.

Encoder 206 encodes the uplink data, SR, CSI, or ACK/NACK in response to the downlink data based on the information inputted from controller 205, and outputs the encoded bit sequence to modulator 207. Note that terminal 200 may transmit UCI (e.g., SR or ACK/NACK) without performing error correction coding on the UCI in encoder 206.

Modulator 207 modulates, based on the information inputted from controller 205, the encoded bit sequence inputted from encoder 206, and outputs a modulated signal (symbol sequence) to signal allocator 208.

Signal allocator 208 maps, based on the information inputted from controller 205, the signal inputted from modulator 207 to the radio resources, and outputs, to transmitter 209, the uplink signal in which the signal is mapped.

Transmitter 209 performs, on the signal inputted from signal allocator 208, transmission signal waveform generation such as OFDM, for example. Further, in the case of OFDM transmission using the CP, transmitter 209 performs IFFT processing on the signal and adds the CP to the signal subjected to IFFT. Alternatively, when transmitter 209 generates a single-carrier waveform, a Discrete Fourier Transform (DFT) section may be added on the downstream side of modulator 207 or on the upstream side of signal allocator 208 (not illustrated). Further, transmitter 209 performs the RF processing such as D/A conversion and up-conversion on a transmission signal, and transmits a radio signal to base station 100 via the antenna.

[Operation Example of Base Station 100 and Terminal 200]

An operation example of base station 100 and terminal 200 having the above configurations will be described.

Hereinafter, terminal operation 1, terminal operation 2, and terminal operation 3 of above-described terminal 200 will be described.

[Terminal Operation 1]

In terminal operation 1, terminal 200 determines the priority of an uplink signal (e.g., UCI or uplink data) in the PHY layer.

By way of example, a determination method of determining priorities of UCIs such as SR, ACK/NACK, and CSI and uplink data (e.g., PUSCH) in the PHY layer will be described below.

<Terminal Operation 1: SR>

An example of a determination method of determining the priority in the PHY layer of an SR to be transmitted by terminal 200 will be described.

The SR is, for example, UCI transmitted when terminal 200 requests assignment of resources for transmission of uplink data to base station 100 (in other words, requests transmission in UL-SCH).

Terminal 200 has, for example, a function for indicating the state of a transmission buffer corresponding to a logical channel of the uplink data in the MAC layer. The function for indicating the state of the transmission buffer is sometimes called "Buffer Status Report (BSR)."

Figure 5:
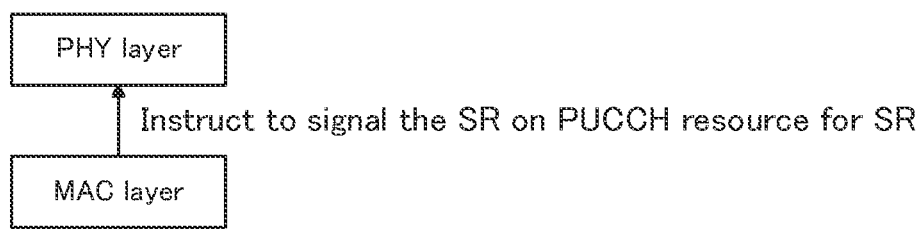
FIG. 5 illustrates an exemplary indication from a medium access control (MAC) layer to a PHY layer in scheduling request (SR) transmission.

When the transmission of the BSR is triggered, and when terminal 200 has not been assigned a radio resource (e.g., PUSCH) for transmitting the BSR, the MAC layer in terminal 200 instructs the PHY layer to transmit an SR using a PUCCH (see, e.g., NPL 6), for example, as illustrated in FIG. 5.

Terminal 200 (e.g., the PHY layer) may determine, by a method described below, the priority of the SR (also referred to as "SR priority") that the MAC layer instructs to transmit.

Figure 6:
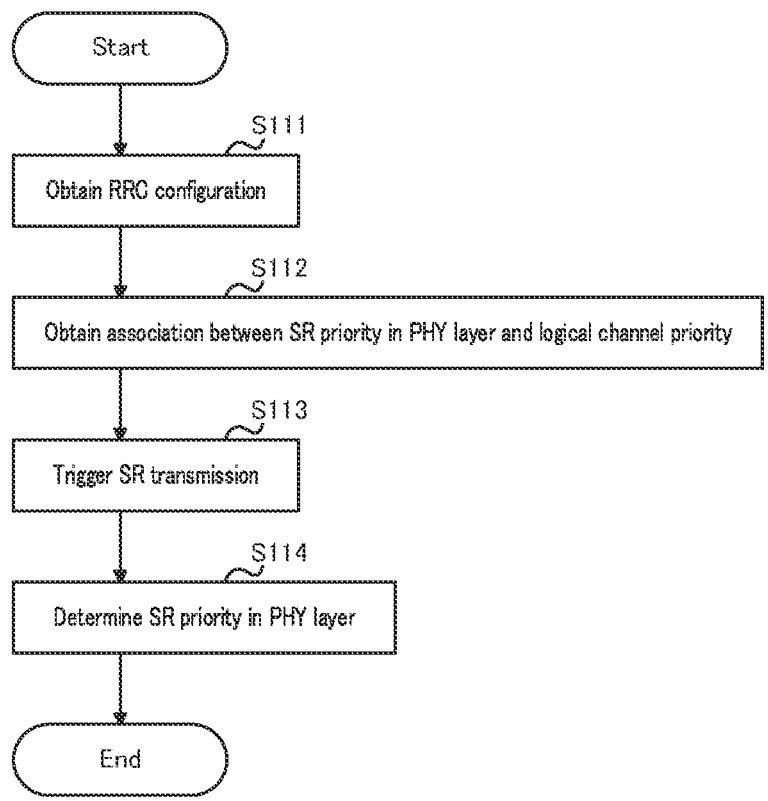
FIG. 6 is a flowchart illustrating an operation example of the terminal according to terminal operation 1.

FIG. 6 is a flowchart illustrating an operation example relating to terminal operation 1 for determining the SR priority.

For example, terminal 200 obtains (in other words, receives) RRC configuration information from base station 100 (S111). The RRC configuration information may include, for example, SR resource configuration information and logical channel configuration information.

Terminal 200 obtains information on the association, for example, between the SR priority in the PHY layer and the logical channel priority (S112). The information on the association between the SR priority in the PHY layer and the logical channel priority may be included, for example, in the RRC configuration information or may be defined in advance in the specifications. Further, for example, when the number of SR priorities (in other words, the number of candidates for the SR priority) in the PHY layer is the same as the number of logical channel priorities (in other words, the number of candidates for the logical channel priority), and the priorities of other uplink signals are compared with the logical channel priority, terminal 200 may omit the processing of S112.

Terminal 200 (e.g., MAC layer) triggers SR transmission (in other words, BSR transmission) (S113).

Terminal 200 may determine the SR priority in the PHY layer (S114). For example, terminal 200 may determine the SR priority based on the logical channel priority corresponding to the uplink data. For example, in the association between SR priorities in the PHY layer and logical channel priorities, terminal 200 may determine the SR priority associated with the logical channel priority of a logical channel that triggered the SR.

Next, an example of the determination method of determining the SR priority in the PHY layer will be described.

(Determination Method 1: Hereinafter Referred to as "Terminal Operation SR-1")

In terminal operation SR-1, terminal 200 (e.g., the MAC layer) determines the SR priority based on the logical channel priority of a logical channel that triggered the SR (or the BSR).

Terminal 200 may obtain the information on each logical channel priority from, for example, the RRC configuration information (see, e.g., NPL 7). In terminal operation SR-1, for example, "priority," which is a parameter configured in "LogicalChannelConfig Information Element (IE)" in NPL 7, may be used as the logical channel priority.

Figure 7:
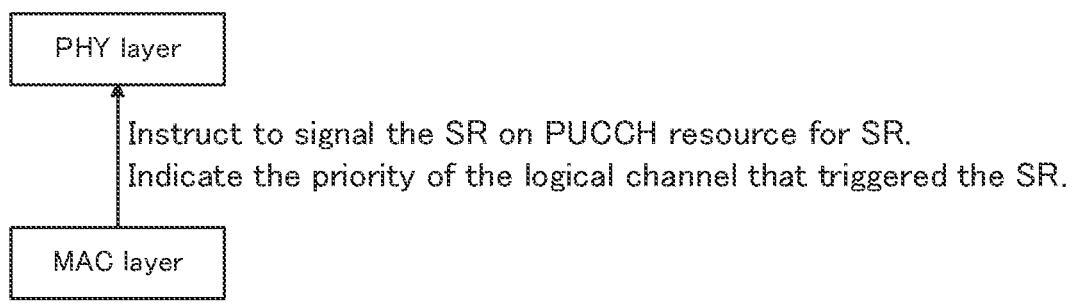
FIG. 7 illustrates an exemplary indication from the MAC layer to the physical (PHY) layer according to terminal operation 1.

As illustrated in FIG. 7, the MAC layer of terminal 200 instructs the PHY layer to transmit the SR using a PUCCH when triggering the SR (in other words, when instructing the PHY layer to transmit the SR). At this time, as illustrated in FIG. 7, for example, information indicating the logical channel priority of a logical channel that triggered the SR may be indicated by the MAC layer to the PHY layer. For example, terminal 200 (PHY layer) may determine the SR priority based on the logical channel priority of the logical channel that triggered the SR.

According to terminal operation SR-1, terminal 200 can uniquely determine the SR priority in the PHY layer based on the logical channel priority of the logical channel that triggered the SR.

Note that, in NR, for example, a plurality of logical channels may correspond to a single SR configuration (or SR resource). Even in this case, since the logical channel priority of a logical channel that triggered the SR is, for example, directly indicated by the MAC layer to the PHY layer, the PHY layer can uniquely determine the SR priority.

Note that, the logical channel priority does not have to be indicated by the MAC layer to the PHY layer. In this case, for example, terminal 200 may uniquely associate the logical channel (or the logical channel priority) with the SR configuration (SR resource). In the PHY layer, terminal 200 may determine the SR priority based on the logical channel priority associated with the SR configuration. In this case, for example, the number of logical channels may be the same as the number of SR configurations (SR resources).

In addition, the case in which the information on the logical channel priority is indicated by the MAC layer to the PHY layer has been described, but the present invention is not limited to this. For example, in the MAC layer, terminal 200 may determine the SR priority based on the logical channel priority. The information on the SR priority may be indicated by the MAC layer to the PHY layer.

(Variation of Terminal Operation SR-1)

In NR Release 15, for example, the number of priorities (in other words, the number of candidates) that can be configured for the logical channel is 16 levels. For example, the logical channel priority is one of 1 to 16, where priority 1 is the highest priority, and the other priorities are serial lower priorities (see, for example, NPL 7).

In terminal operation SR-1, in the PHY layer, terminal 200 may configure, to the SR priority in the PHY layer, the logical channel priority indicated by the MAC layer. In this case, the number of logical channel priorities (in other words, the number of candidates for the logical channel priority) may be the same as the number of SR priorities (in other words, the number of candidates for the SR priority) in the PHY layer.

However, the number (in other words, granularity) of SR priorities in the PHY layer may be different from the number of logical channel priorities.

For example, the number of SR priorities in the PHY layer may be smaller than the number of logical channel priorities. FIG. 8 illustrates an example of the association between the logical channel priority and the SR priority in the PHY layer in a case where the number of SR priorities in the PHY layer is smaller than the number of logical channel priorities. The association between the logical channel priority and the SR priority in the PHY layer may be defined in advance in the specifications, for example, or may be configured by base station 100 for terminal 200 through the RRC. In the example of FIG. 8, the number of SR priorities in the PHY layer is 4 (the priority is one of 1 to 4), but the number of SR priorities is not limited to 4 and may be another number.

By making the number of SR priorities in the PHY layer smaller than the number of logical channel priorities, the number of SR priorities in the PHY layer can be fewer. Reducing the number of SR priorities can reduce the overhead of a control signal, for example, in priority comparison with ACK/NACK, which will be described later.

Note that, the number of SR priorities in the PHY layer may be greater than the number of logical channel priorities. (Determination Method 2: Hereinafter Referred to as "Terminal Operation SR-2")

In terminal operation SR-2, like terminal operation SR-1, terminal 200 (e.g., the MAC layer) determines the SR priority based on the logical channel priority of a logical channel that triggered the SR (or the BSR).

Terminal 200 may obtain the information on each logical channel priority from, for example, the RRC configuration (see, e.g., NPL 7). In terminal operation SR-2, for example, terminal 200 determines the SR priority based on the logical channel priority associated with information (e.g., an SR resource ID) on a resource used for transmitting the SR. For example, terminal 200 may determine the SR priority in the PHY layer based on "priority," which is a parameter relevant to the logical channel priority configured in "LogicalChannelConfig IE" in NPL 7, and "schedulingRequestId," which is a parameter relevant to the SR configured in "LogicalChannelConfig IE" and "SchedulingRequestResourceConfig IE."

For example, in terminal 200, when triggering the SR, the MAC layer instructs the PHY layer to transmit the SR using the PUCCH, as illustrated in FIG. 5. At this time, an SR resource (e.g., SchedulingRequestResourceConfig IE) for transmitting the SR is indicated by the MAC layer to the PHY layer (not illustrated).

Terminal 200 (e.g., the PHY layer) identifies the SR resource ID (e.g., schedulingRequestId) corresponding to the SR resource based on the SR resource indicated by the MAC layer. Further, for example, based on the "LogicalChannelConfig IE," terminal 200 (e.g., the PHY layer) identifies the logical channel for which the SR resource ID of the SR resource indicated by the MAC layer is assigned and the priority of the logical channel. Then, terminal 200 (e.g., the PHY layer) may determine the SR priority in the PHY layer, for example, based on the identified logical channel priority.

FIG. 9 illustrates an example of the association between the logical channel (e.g., a logical channel number), the logical channel priority, and the SR resource ID according to terminal operation SR-2.

For example, based on FIG. 9, terminal 200 identifies the logical channel and the priority of the logical channel that are associated with the SR resource ID corresponding to the SR resource indicated by the MAC layer. Then, terminal 200 may determine the SR priority based on the identified logical channel priority based on FIG. 9.

In terminal operation SR-2, terminal 200 (e.g., the PHY layer) can identify the SR resource and the logical channel priority corresponding to the SR resource by obtaining the logical channel configuration (e.g., the logical channel number and the priority illustrated in FIG. 9) and the SR resource configuration (e.g., the SR resource ID illustrated in FIG. 9) from the RRC configuration.

In terminal operation SR-2, terminal 200 can determine the SR priority based on the identified logical channel priority without indication of the priority information from the MAC layer to the PHY layer. In other words, since terminal 200 can determine the SR priority based on the SR resource indicated by the MAC layer to the PHY layer, it is not necessary, unlike terminal operation SR-1, to indicate the logical channel (e.g., the logical channel priority) that triggered the SR every time the SR is triggered.

(Variation 1 of Terminal Operation SR-2 (Hereinafter Referred to as Terminal Operation SR2-1))

In NR, for example, a plurality of logical channels may correspond to a single SR configuration (or SR resource). In this case, for example, in terminal 200, pieces of information on the respective different priorities of the plurality of logical channels corresponding to the single SR configuration may be indicated by the MAC layer to the PHY layer.

In terminal operation SR2-1, when a single SR configuration (or SR resource) corresponds to a plurality of logical channels, terminal 200 (e.g., the PHY layer) may determine the SR priority in the PHY layer based on the priority of any one logical channel of the plurality of logical channels corresponding to a triggered SR resource.

For example, terminal 200 may determine the SR priority in the PHY layer based on the logical channel priority having the highest priority among the plurality of logical channels corresponding to the triggered SR resource.

FIG. 10 illustrates an example of association between logical channels according to terminal operation SR2-1, logical channel priorities, and SR resource IDs, and SR priorities in the PHY layer. In FIG. 10, the SR priority in the PHY layer is determined based on the highest logical channel priority among the priorities of the plurality of logical channels. For example, when the logical channels with logical channel numbers 9 to 14 correspond to a single SR configuration (SR resource ID=2), terminal 200 determines the SR priority based on priority 9 the highest between priorities 9 and 10 corresponding to logical channel numbers 9 to 14. The same applies to the other logical channel numbers illustrated in FIG. 10.

Note that, in terminal operation SR2-1, the determination method of determining the SR priority in the PHY layer is not limited to the method based on the logical channel priority having the highest priority among a plurality of logical channels. For example, the SR priority may be determined based on the priority of one of the plurality of logical channels. For example, when the SR priority is determined based on the logical channel priority that is the highest among a plurality of logical channels, for example, the SR is more likely to be assigned a higher priority than other uplink signals (e.g., ACK/NACK, CSI, or uplink data) in terminal operation 2 or 3 described later.

According to terminal operation SR2-1, even when a single SR configuration corresponds to a plurality of logical channels, terminal 200 can uniquely determine the SR priority in the PHY layer based on the logical channels corresponding to the SR configuration (e.g., the SR resource ID).

(Variation 2 of Terminal Operation SR-2 (Hereinafter Referred to as Terminal Operation SR2-2))

For example, like terminal operation SR-1 or the variation of terminal operation SR-1, terminal 200 may configure, in the PHY layer, the logical channel priority indicated by the MAC layer to the SR priority in the PHY layer. Alternatively, the number (in other words, the granularity) of SR priorities in the PHY layer may be different from the number of logical channel priorities.

For example, the number of SR priorities in the PHY layer may be smaller than the number of logical channel priorities. The association between the logical channel priority and the SR priority in the PHY layer may be defined in advance in the specifications, for example, or may be configured by base station 100 for terminal 200 through the RRC.

By making the number of SR priorities in the PHY layer smaller than the number of logical channel priorities, the number of SR priorities in the PHY layer can be fewer. Reducing the number of SR priorities can reduce the overhead of a control signal, for example, in priority comparison with ACK/NACK, which will be described later.

(Determination Method 3: Hereinafter Referred to as "Terminal Operation SR-3")

In terminal operation SR-3, terminal 200 obtains information on the association between the SR resource configuration and the SR priority in the PHY layer from the configuration of the RRC.

For example, a parameter indicating the SR priority in the PHY layer may be added to SchedulingRequestId IE in NPL 7. FIG. 11 illustrates an example of SchedulingRequestId IE in terminal operating SR-3. As illustrated in FIG. 11, the parameter indicating, for example, the SR priority (in other words, a field) "priority" is added to SchedulingRequestId IE.

For example, in terminal 200, when triggering the SR, the MAC layer instructs the PHY layer to transmit the SR using the PUCCH, as illustrated in FIG. 5. At this time, an SR resource for transmitting the SR is indicated from the MAC layer to the PHY layer.

Terminal 200 (e.g., the PHY layer) identifies the SR resource ID (e.g., SchedulingRequestId) corresponding to the SR resource based on the SR resource indicated by the MAC layer. Further, terminal 200 (e.g., the PHY layer) determines the SR priority (e.g., "priority" illustrated in FIG. 11) corresponding to the identified SR resource ID based on the RRC configuration (e.g., SchedulingRequestId IE).

According to terminal operation SR-3, terminal 200 (e.g., the PHY layer) can uniquely determine the priority in the PHY layer based on the SR resource indicated in the RRC configuration.

Further, according to terminal operation SR-3, the priority of the SR resource in the PHY layer is configured independently of the logical channel priority. Thus, for example, the number of SR priorities in the PHY layer does not have to be the same as the number of logical channel priorities. In addition, the specifications or the RRC configuration for configuring the association between the SR priority and the logical channel priority do not have to be provided.

The examples of the determination method of determining the SR priority in the PHY layer have been described above.

<Terminal Operation 1: ACK/NACK>

Next, an example of a determination method of determining the priority in the PHY layer of ACK/NACK to be transmitted by terminal 200 will be described.

The ACK/NACK is, for example, UCI indicating an error detection result for downlink data (DL-SCH) transmitted in a PDSCH. In other words, the ACK/NACK is a response signal to the downlink data.

The terminal decodes the PDSCH to obtain, for example, information on the logical channel of the downlink data transmitted using DL-SCH (including, for example, the logical channel priority). For example, the terminal may determine the ACK/NACK priority in the PHY layer based on information on the logical channel priority. However, in this case, there is scope of further study on the following two points.

First, when the PDSCH cannot be decoded correctly, the logical channel priority cannot be obtained. Accordingly, while it is possible for the terminal to utilize the information on the logical channel priority when transmitting ACK (in other words, no error in DL-SCH), it is impossible to utilize the information on the logical channel priority when transmitting NACK.

Second, the information on the logical channel of the downlink data is included in the MAC Control Element (MAC CE), and a processing delay occurs in order for the terminal to decode the MAC CE and obtain the information in the MAC CE. Generally, the processing delay for the terminal to decode the MAC CE and obtain the information in the MAC CE is greater than a processing delay between decoding of the PDSCH by the terminal and generation and transmission of the ACK/NACK in response to the PDSCH.

In addition, for example, NPLs 8 and 9 disclose that a base station introduces a Priority indication for indicating a terminal of DL assignment (or DCI) for scheduling a PDSCH, with information on a priority being included in the DL assignment. However, in NR Release 15, the number of priorities that can be configured for the logical channel is 16, and thus, a DCI overhead caused when the PDSCH including the logical channel priority is indicated increases.

Also, in order to support services with different requirements (e.g., eMBB and URLLC) in NR Release 16, HARQ codebooks (e.g., ACK/NACK bit sequences) for transmitting ACK/NACK may be generated variously depending on the respective services. At this time, information for indicating which HARQ codebook the PDSCH transmitted to the terminal corresponds to can be included in the DL assignment (or DCI) and indicated by the base station to the terminal.

For example, the terminal may determine the ACK/NACK priority based on the indication of the HARQ codebook. In other words, the base station may utilize (in other words, reuse) the indication of the HARQ codebook to indicate the ACK/NACK priority. However, it is assumed that the maximum number of HARQ codebooks generated variously depending on the services is limited. For example, the maximum number of HARQ codebooks may be a number (e.g., 2) smaller than the number of priorities (e.g., 16) of the logical channel. Therefore, it is difficult to indicate the logical channel priority included in the PDSCH by including in the DCI.

Figure 12:
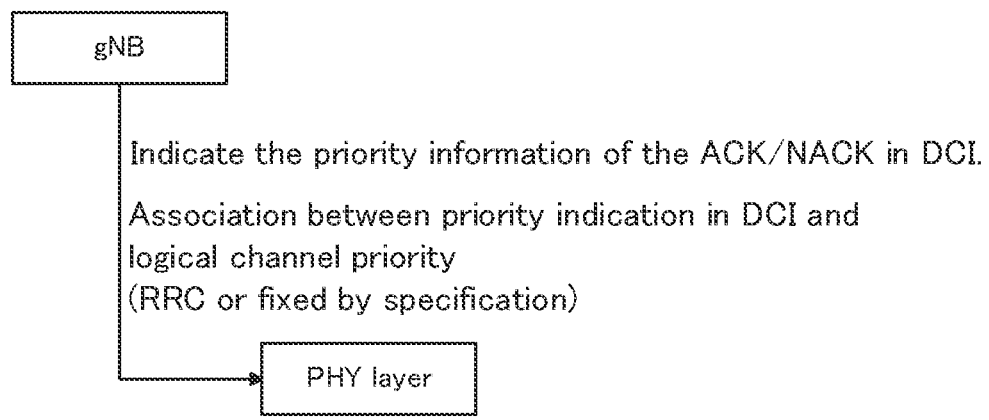
FIG. 12 illustrates an exemplary indication from gNB to a UE (PHY layer) according to terminal operation 1.

In one exemplary embodiment of the present disclosure, terminal 200 determines the ACK/NACK priority based on, for example, downlink control information (e.g., DL assignment or DCI) indicated by base station 100. For example, as illustrated in FIG. 12, terminal 200 determines the ACK/NACK priority in the PHY layer based on the information included in the DL assignment (or DCI) for scheduling downlink data (e.g., PDSCH) corresponding to ACK/NACK or based on the parameters of the DCI.

At this time, the granularity of the information (e.g., referred to as "priority information") for determining the ACK/NACK priority indicated by the information included in the DL assignment (or DCI) or the parameters of the DCI may be greater than the number of logical channel priorities (or number of priorities of another UCI such as the SR), for example. For example, when the number of logical channel priorities is 16 levels, the granularity (in other words, the number of candidates) of the information for determining the ACK/NACK priority indicated by the information included in the DL assignment (or DCI) or the parameters of the DCI may be a value corresponding to a number fewer than 16.

For example, terminal 200 may determine the ACK/NACK priority in the PHY layer based on the association between, on one hand, the information (priority information) for determining the ACK/NACK priority that can be indicated by the information included in the DL assignment (or DCI) or the parameters of the DCI and, on the other hand, the logical channel priority (or the priority of another UCI such as the SR) corresponding to downlink data.

Figure 13:
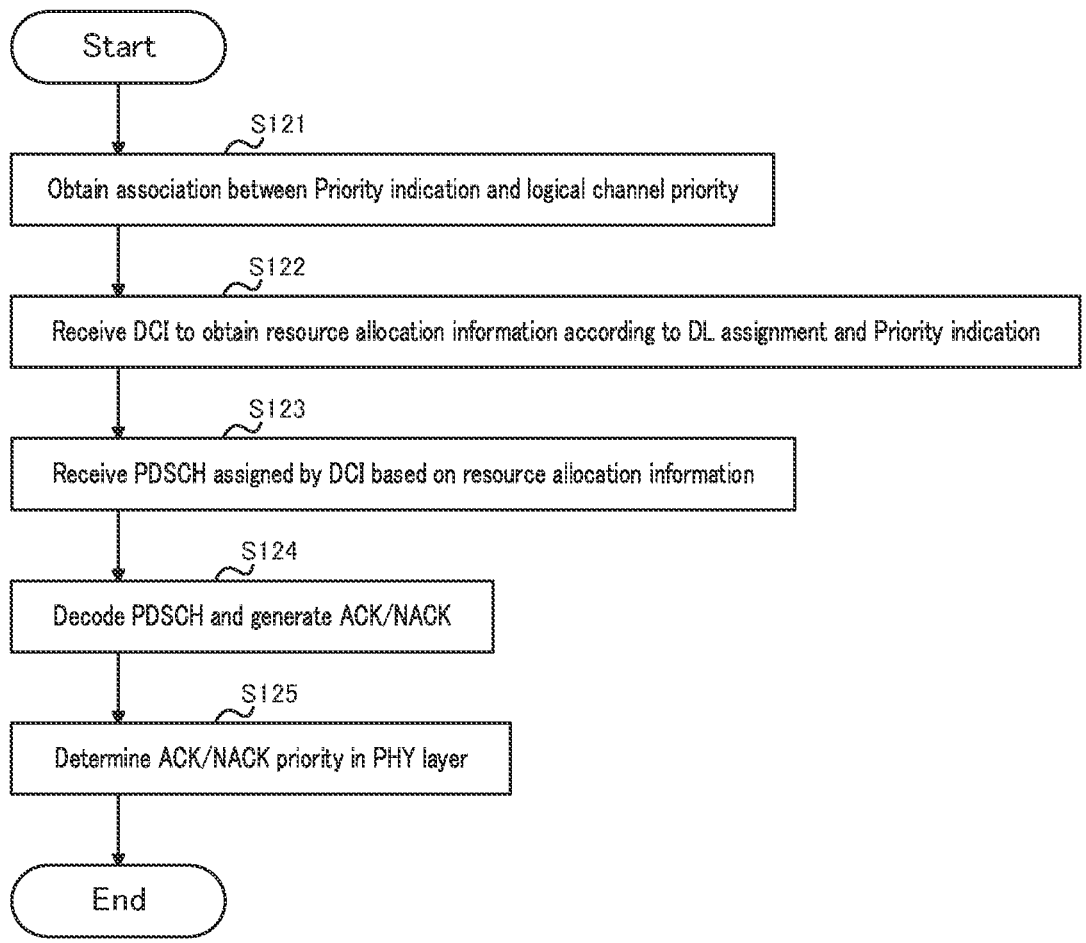
FIG. 13 is a flowchart illustrating an operation example of the terminal according to terminal operation 1.

FIG. 13 is a flowchart illustrating an exemplary operation relating to terminal operation 1 for determining the ACK/NACK priority.

For example, terminal 200 obtains the information on the association between the information (priority information) for determining the ACK/NACK priority and the logical channel priority (S121). The information on the association between the information for determining the ACK/NACK priority and the logical channel priority may be configured by base station 100 for terminal 200 by RRC, for example, or may be predefined in the specifications.

For example, terminal 200 receives the DCI from base station 100 and obtains resource allocation information included in the DL assignment and the information (priority information) for determining the ACK/NACK priority that are included in the DCI (S122).

For example, based on the obtained resource allocation information, terminal 200 receives a PDSCH signal (in other words, DL-SCH or downlink data) assigned by the DCI (S123). Terminal 200 decodes the received PDSCH and generates the ACK/NACK (S124).

Terminal 200 determines, for example, the ACK/NACK priority in the PHY layer (S125). For example, terminal 200 determines the logical channel priority corresponding to the information for determining the ACK/NACK priority included in the DCI based on the association between the information for determining the ACK/NACK priority and the logical channel priority. In addition, terminal 200 may determine the ACK/NACK priority based on the determined logical channel priority.

Note that, in FIG. 13, the processing at step S125 (processing of determining the ACK/NACK priority in the PHY layer) may be performed prior to the processing at step S123 (receiving the PDSCH) or the processing at step S124 (generation of ACK/NACK).

According to an exemplary embodiment of the present disclosure, terminal 200 can determine the ACK/NACK priority of ACK/NACK in response to the PDSCH based on the information indicated by the DCI. It is thus possible to suppress an increase in the processing delay for decoding MAC CE, for example. Further, terminal 200 can determine the ACK/NACK priority by receiving the DCI. In other words, terminal 200 can determine the ACK/NACK priority (e.g., the logical channel priority) even when the PDSCH cannot be decoded correctly (e.g., when transmitting a NACK).

Next, by way of example, a method of associating the information (priority information) for determining the ACK/NACK priority that can be indicated by the DL assignment (or DCI) with the logical channel priority (or the priority of another UCI such as the SR) will be described.

(Method 1: Hereinafter, Referred to as "Terminal Operation ACK/NACK-1")

In terminal operation ACK/NACK-1, the association between the information for determining the ACK/NACK priority and the logical channel priority is configured, for example, by base station 100 for terminal 200 by the RRC.

FIG. 14 illustrates an example of the association between the information for determining the ACK/NACK priority and the logical channel priority.

In FIG. 14, terminal 200 is indicated of information (e.g., priority indicator) on the priority of ACK/NACK (in other words, PDSCH) in one bit of the DCI.

For example, in one exemplary RRC configuration (configuration 1), information "0" on the priority indicated by the DCI and logical channel priority "1" are associated with each other, and information "1" on the priority indicated by the DCI and logical channel priority "10" are associated with each other. Further, in another exemplary RRC configuration (configuration 2), information "0" on the priority indicated by the DCI and logical channel priority "8" are associated, and information "1" on the priority indicated by the DCI and logical channel priority "16" are associated with each other. Note that, the RRC configuration is not limited to the examples illustrated in FIG. 14. For example, the number of bits of information on the priority indicated by the DCI may be two or more.

For example, terminal 200 (PHY layer) identifies the logical channel priority corresponding to the information on the ACK/NACK priority included in the DCI based on the association between the information on the ACK/NACK priority and the logical channel priority (see, for example, FIG. 14). Terminal 200 determines the ACK/NACK priority in the PHY layer based on the identified logical channel priority.

In terminal operation ACK/NACK-1, since terminal 200 determines the ACK/NACK priority based on, for example, indication using one bit of the DCI, a processing delay for decoding MAC CE does not occur. In addition, in terminal operation ACK/NACK-1, the amount of information on the priority indicated by the DCI (1 bit in FIG. 14) can be smaller than the number of logical channel priorities (e.g., 16 priorities; 4 bit), and it is thus possible to suppress the increase in the DCI overhead. Further, in terminal operation ACK/NACK-1, base station 100 can flexibly configure each terminal 200 with the association between the information for determining the ACK/NACK priority and the logical channel priority by the RRC configuration.

Note that, the information associated with the information for determining the ACK/NACK priority, which can be indicated by the DL assignment (or DCI), is not limited to the logical channel priority, but may also be, for example, the SR priority in the PHY layer or the priority of another signal in the PHY layer.

(Method 2: Hereinafter Referred to as "Terminal Operation ACK/NACK-2")

In terminal operation ACK/NACK-2, the association between the information for determining the ACK/NACK priority and the logical channel priority is predefined in the specifications, for example.

For example, when terminal 200 is indicated of the information on the ACK/NACK priority (in other words, PDSCH) in one bit of the DCI, the association between information "0" on the priority indicated by the DCI and logical channel priority "1" and the association between information "1" on the priority indicated by the DCI and logical channel priority "10" may be predetermined in the specifications. Note that, the association between the priority information indicated by the DCI and the logical channel priority is not limited to the above examples, and may be another association.

Terminal operation ACK/NACK-2 eliminates the need for configuration of the RRC relevant to the association between the information for determining the ACK/NACK priority and the logical channel priority, thus reducing a signaling overhead related to the RRC configuration.

The examples of the association between the information for determining the ACK/NACK priority and the logical channel priority have been described.

Note that the information for determining the ACK/NACK priority is not limited to the explicit information included in the DL assignment (or DCI) as described above, but may be implicitly indicated by, for example, the parameters of the DCI. For example, the information for determining the ACK/NACK priority may be implicitly indicated by at least one of a difference in DCI format, a difference in RNTI, a parameter of the DCI, a parameter of a search space or a Control Resource Set (CORESET) of a PDCCH transmitting the DCI, and configuration information.

(Variation 1 of Terminal Operation 1: ACK/NACK)

The information for determining the ACK/NACK priority that can be indicated by the information included in the DL assignment (or DCI) or the parameters of the DCI may be associated with a plurality of logical channel priorities (or priorities of another UCI such as the SR).

FIG. 15 illustrates an example of the association between the information for determining the ACK/NACK priority and the logical channel priority.

In FIG. 15, for example, priority information "0" indicated by the DCI is associated with priority set 2 including logical channel priorities 2 to 7. In FIG. 15, for example, information "1" on the priority indicated by the DCI is associated with priority set 3 including logical channel priorities 8 to 15.

In FIG. 15, for example, priority set 1 including logical channel priority 1 corresponds to a priority higher than any ACK/NACK priority. In FIG. 15, for example, priority set 4 including logical channel priority 16 corresponds to a priority lower than any ACK/NACK priority.

As is understood, the logical channel priorities may be grouped into a plurality of priority sets including priority sets associated with the ACK/NACK priorities. Note that the logical channels included in the priority sets are not limited to those in the example illustrated in FIG. 15.

Grouping of the logical channel priorities can make it easier, for example, for terminal 200 to configure the same priority between ACK/NACK and another uplink signal different from ACK/NACK, such as the SR, CSI, or uplink data. For example, in FIG. 15, when the priority of an uplink signal different from ACK/NACK is within the range of logical channel priorities 2 to 7 (e.g., priority set 2), terminal 200 determines that the ACK/NACK priority and the priority of the other uplink signal are the same. Since the same priority is more likely to be configured for the ACK/NACK and the other uplink signal, it becomes easier for terminal 200 to multiplex and transmit a plurality of uplink signals when determining uplink signals to be actually transmitted in terminal operation 3, for example.

(Variation 2 of Terminal Operation 1: ACK/NACK)

The information for determining the ACK/NACK priority that can be indicated by the information included in the DL assignment (or DCI) or the parameters of the DCI does not have to match any level of logical channel priority (or of the priority of another UCI such as the SR).

For example, information "0" on the ACK/NACK priority indicated by the DCI may be associated with a level lower than logical channel priority 1 and higher than logical channel priority 2. Note that this ACK/NACK priority configuration is an example, and the ACK/NACK priority may be of another value.

This priority configuration allows terminal 200 to configure different priorities between the ACK/NACK and other uplink signals different from the ACK/NACK. Therefore, terminal 200 can clearly distinguish priorities of a plurality of uplink signals when determining, for example, an uplink signal to be actually transmitted in terminal operation 3. For example, it becomes possible for terminal 200 to easily apply the operation of "Prioritization" of dropping a signal having a low priority while transmitting a signal having a high priority. It is thus possible to simplify the processing of terminal 200.

<Terminal Operation 1: CSI>

Next, an example of a determination method of determining the priority in the PHY layer of CSI to be transmitted by terminal 200 will be described.

The CSI is, for example, UCI indicating downlink channel state information.

Figure 16:
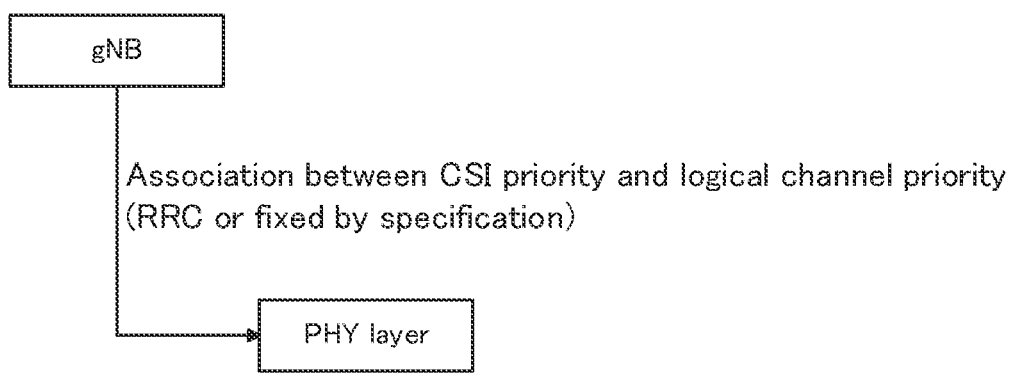
FIG. 16 illustrates an exemplary indication from gNB to a UE (PHY layer) according to terminal operation 1.

For example, as illustrated in FIG. 16, terminal 200 determines the priority of the CSI (also referred to as "CSI priority") in the PHY layer in association with the logical channel priority (or the priority of another UCI such as the SR). The association between the logical channel priority and the CSI priority may be preconfigured in terminal 200 by RRC, for example, or may be predefined in the specifications.

For example, information on the association between the CSI priority and logical channel priority "10" may be configured by base station 100 for terminal 200 by the RRC. Note that the logical channel priority associated with the CSI priority is not limited to "10," but may be another priority. For example, base station 100 may flexibly configure each terminal 200 with the association between the CSI priority and the logical channel priority by the RRC configuration.

Alternatively, the CSI priority may be predefined in the specifications. For example, the CSI priority may be associated with logical channel priority "10." Alternatively, the CSI priority may be configured to the lowest priority among the logical channel priorities. Predefining the CSI priority in the specifications can eliminate the need for configuration of the RRC to reduce the signaling overhead related to the RRC configuration.

Figure 17:
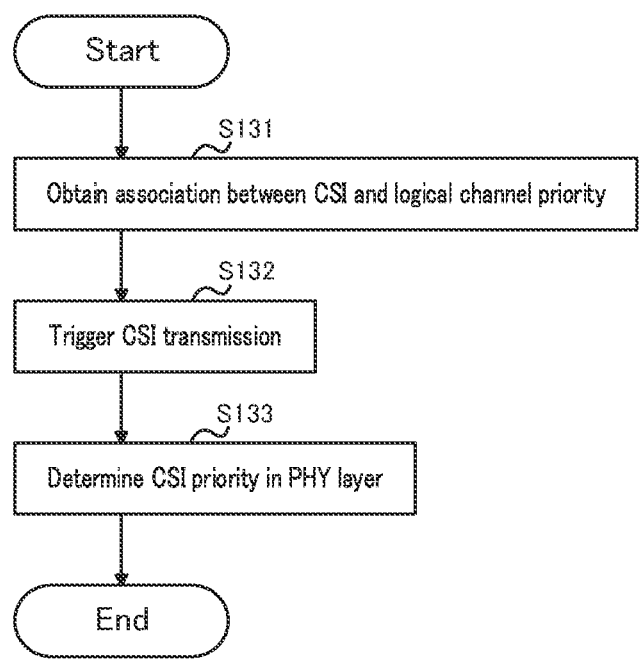
FIG. 17 is a flowchart illustrating an operation example of the terminal according to terminal operation 1.

FIG. 17 is a flowchart illustrating an operation example relating to terminal operation 1 for determining the CSI priority.

Terminal 200 obtains information on the association between, for example, the CSI priority and the logical channel priority (S131). The information on the association between the CSI priority and the logical channel priority may be configured by base station 100 for terminal 200 by RRC, for example, or may be predefined in the specifications.

Terminal 200 triggers, for example, transmission of CSI (S132).

Terminal 200 may determine the CSI priority in the PHY layer, for example (S133). For example, terminal 200 may determine the CSI priority based on the association between the CSI priority and the logical channel priority.

Note that, in FIG. 17, the processing at S132 (triggering of CSI transmission) and the processing at S133 (determining of the CSI priority in the PHY layer) may be performed in a reverse order.

According to one exemplary embodiment of the present disclosure, terminal 200 can determine the CSI priority in the PHY layer. By determining the CSI priority, terminal 200 can compare priorities between the CSI and the logical channel (or another UCI such as the SR).

(Variation 1 of Terminal Operation 1: CSI)

The CSI priority may be associated with a plurality of logical channel priorities (or priorities of another UCI such as the SR).

FIG. 18 illustrates an example of the association between the CSI priority and the logical channel priority.

In FIG. 18, for example, priority set 1 including logical channel priorities 1 to 7 corresponds to a priority higher than the CSI priority. Further, in FIG. 18, for example, priority set 2 including logical channel priorities 8 to 15 corresponds to the same priority as the CSI priority. Further, in FIG. 18, for example, priority set 3 including logical channel priority 16 corresponds to a priority lower than the CSI priority.

As is understood, the logical channel priorities may be grouped into a plurality of priority sets including priority sets associated with the CSI priorities. Note that the logical channels included in the priority set are not limited to those in the example illustrated in FIG. 18.

Grouping of the logical channel priorities can make it easier, for example, for terminal 200 to configure the same priority between CSI and another uplink signal different from CSI, such as the SR, ACK/NACK, or uplink data. For example, in FIG. 18, when the priority of an uplink signal different from CSI is within the range of logical channel priorities 8 to 15 (e.g., priority set 2), terminal 200 determines that the CSI priority and the priority of the other uplink signal are the same. Since the same priority is more likely to be configured for the CSI and the other uplink signal, it becomes easier for terminal 200 to multiplex and transmit a plurality of uplink signals when determining uplink signals to be actually transmitted in terminal operation 3, for example.

(Variation 2 of Terminal Operation 1: CSI)

The CSI priority does not have to match any level of logical channel priority (or of priority of another UCI such as the SR).

For example, the CSI priority may be configured to a level lower than logical channel priority 7 and higher than logical channel priority 8. Note that this CSI priority configuration is an example, and the CSI priority may be another value.

This priority configuration allows terminal 200 to make priorities different between the CSI and other uplink signals than the CSI. Therefore, terminal 200 can clearly distinguish priorities of a plurality of uplink signals when determining, for example, an uplink signal to be actually transmitted in terminal operation 3. For example, it becomes possible for terminal 200 to easily apply the operation of "Prioritization" of dropping a signal having a low priority while transmitting a signal having a high priority. It is thus possible to simplify the processing of terminal 200.

(Variation 3 of Terminal Operation 1: CSI)

The example described above has been described in relation to a case where a single priority is configured for the CSI. However, a plurality of CSI priorities may be configured.

For example, a plurality of priorities may be configured for the CSI depending on the type of CSI or the type of service and traffic with different requirements. For example, CSI priorities may be different depending on the types of CSI report, such as Periodic CSI, Semi-persistent CSI, and Aperiodic CSI.

<Terminal Operation 1: Uplink Data>

Next, an example of a determination method of determining the priority in the PHY layer of uplink data to be transmitted by terminal 200 will be described.

For example, terminal 200 has, in the MAC layer, a function of mapping, to a transport channel, transmission data corresponding to a logical channel. For example, when, upon reception of an uplink grant, there is uplink data to be transmitted, the MAC layer generates, for the PHY, a Transport Block (TB) according to the uplink grant and instructs the PHY layer to transmit the uplink data (see, for example, NPL 6).

At this time, terminal 200 (e.g., the PHY layer) may determine, based on the following method, the priority of uplink data (TB) that the MAC layer instructed to transmit.

For example, terminal 200 (e.g., the MAC layer) may determine the uplink data (TB) priority based on the logical channel priority of a logical channel that triggered the TB. Terminal 200 may obtain the information on each logical channel priority from, for example, the RRC configuration information (see, e.g., NPL 7). For example, "priority," which is a parameter relevant to the priority configured in "LogicalChannelConfig IE" in NPL 7, may be used for the logical channel priority.

Figure 19:
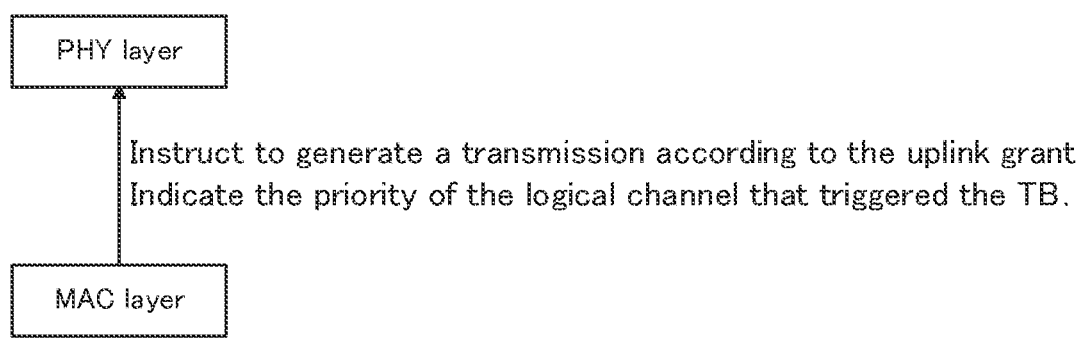
FIG. 19 illustrates an exemplary indication from the MAC layer to the PHY layer according to terminal operation 1.

As illustrated in FIG. 19, in terminal 200, the MAC layer instructs the PHY layer to transmit uplink data when triggering a TB. At this time, as illustrated in FIG. 19, for example, information on the logical channel priority of a logical channel that triggered the TB may be indicated by the MAC layer to the PHY layer. For example, terminal 200 (the PHY layer) may determine the priority of an uplink signal based on the logical channel priority of the logical channel that triggered the TB.

Further, the TB may include, for example, data corresponding to a plurality of logical channels. In this case, for example, any one of the logical channel priorities that triggered the TB may be indicated by the MAC layer to the PHY layer. For example, among the logical channel priorities that triggered the TB, the logical channel priority having the highest priority may be indicated by the MAC layer to the PHY layer, or the logical channel priority having the lowest priority may be indicated by the MAC layer to the PHY layer.

Figure 20:
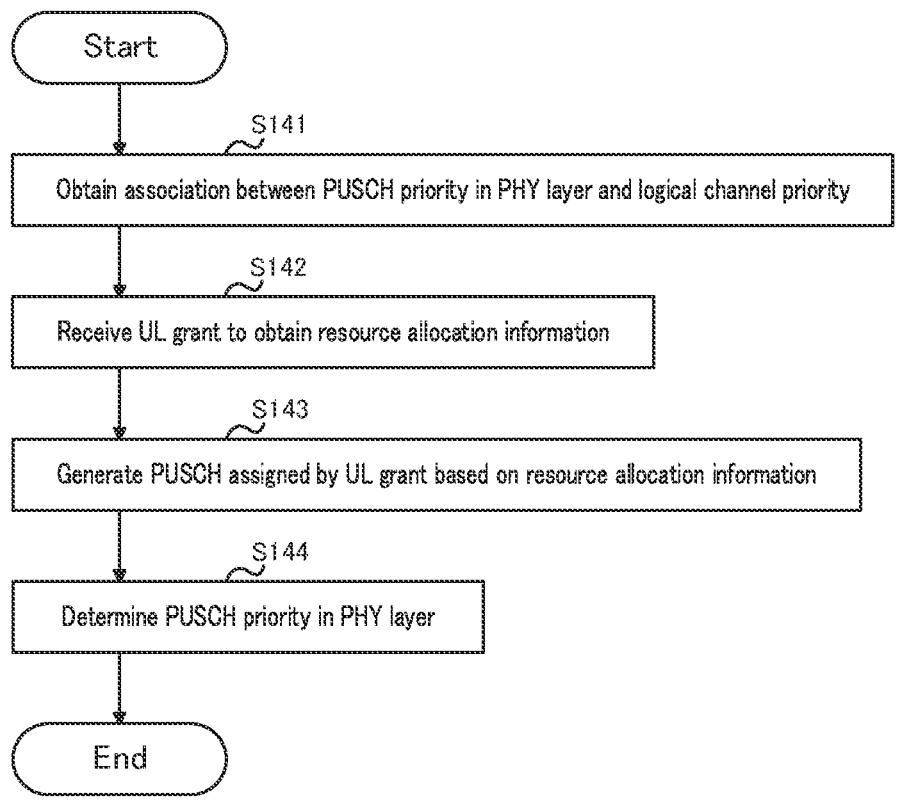
FIG. 20 is a flowchart illustrating an operation example of the terminal according to terminal operation 1.

FIG. 20 is a flowchart illustrating an operation example relating to terminal operation 1 for determining the priority of uplink data (also referred to as "uplink data priority").

For example, terminal 200 obtains information on the association between the priority of uplink data (e.g., PUSCH) in the PHY layer and the logical channel priority (S141). The information on the association between the priority of the uplink data and the logical channel priority may be configured by base station 100 for terminal 200 by RRC, for example, or may be predefined in the specifications.

Terminal 200, for example, receives an uplink grant from base station 100 and obtains resource allocation information for the uplink data (S142).

For example, terminal 200 generates the uplink data (PUSCH) based on the obtained resource allocation information (S143).

For example, terminal 200 may determine the priority of the uplink data in the PHY layer (S144). For example, terminal 200 may determine the priority of the uplink data based on the logical channel priority of a logical channel that triggered the TB based on the association between the priority of the uplink data and the logical channel priority.

For example, terminal 200 may configure, to the priority of the uplink data in the PHY layer, the logical channel priority indicated by the MAC layer to the PHY layer.

In addition, for example, terminal 200 may make the number (in other words, the granularity) of uplink data priorities in the PHY layer different from the number of logical channel priorities. In this case, the priority of the uplink data in the PHY layer may be determined in association with the logical channel priority. The association between the priority of the uplink data and the logical channel priority may be configured for terminal 200 by RRC, for example, or may be predefined in the specifications.

Note that in FIG. 20, for example, when the number of uplink data priorities in the PHY layer and the number of logical channel priorities are the same and the priorities of other uplink signals are compared with reference to a logical channel priority, terminal 200 may omit the processing at S141.

According to one exemplary embodiment of the present disclosure, the priority of the uplink data determined based on the logical channel priority of a logical channel that triggered a TB, for example, is indicated by the MAC layer to the PHY layer. The PHY layer can thus uniquely determine the priority of the uplink data.

Terminal operation 1 has been described above.

[Terminal Operation 2]

In terminal operation 2, when transmissions of a plurality of uplink signals (UCI or uplink data) overlap one another in the time domain, terminal 200 determines priorities of a plurality of uplink signals based on a priority of each uplink signal in the PHY layer determined in terminal operation 1.

Figure 21:
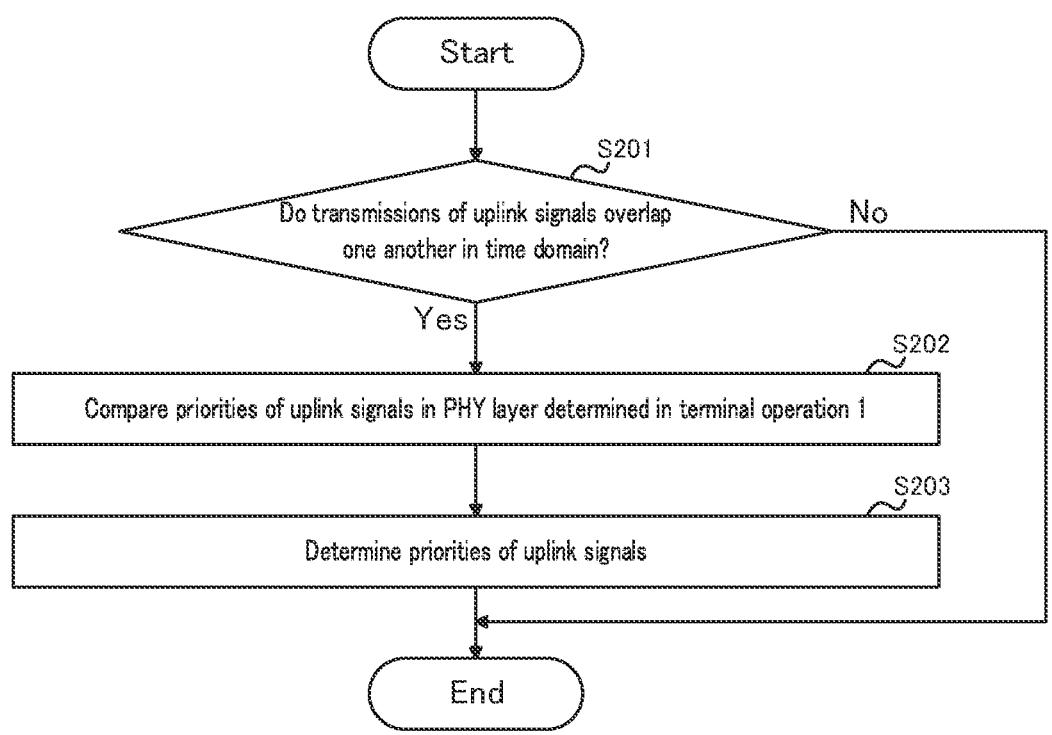
FIG. 21 is a flowchart illustrating an operation example of the terminal according to terminal operation 2.

FIG. 21 is a flowchart illustrating an example of an operation related to terminal operation 2 in terminal 200.

Terminal 200, for example, determines whether or not transmissions of a plurality of uplink signals (e.g., UCI or uplink data) overlap one another in the time domain (S201). When the transmissions of a plurality of uplink signals do not overlap one another in the time domain (S201: No), terminal 200 ends terminal operation 2 (e.g., the processing of FIG. 21).

When the transmissions of the plurality of uplink signals overlap one another in the time domain (S201: Yes), terminal 200 compares the priorities of the plurality of uplink signals with one another, for example, based on the priorities of the respective uplink signals in the PHY layer determined in terminal operation 1 (S202). Then, terminal 200 determines the priorities of the uplink signals (e.g., determines the relationship in magnitude between the priorities, or determines whether one priority is the same as or different from another) based on the comparison result of comparing the priorities of a plurality of uplink signals with one another (S203).

Here, for example, each of the numbers of priorities of SR, ACK/NACK, CSI, and uplink data in the PHY layer may be the same as the number of logical channels priorities. In this case, terminal 200 may compare the priorities of SR, ACK/NACK, CSI, and uplink data with one another based on the logical channel priorities. For example, in terminal operation 1, when the SR priority in the PHY layer corresponds to logical channel priority 1 and the ACK/NACK priority in the PHY layer corresponds to logical channel priority 2, terminal 200 can determine that the SR priority is higher than the ACK/NACK priority.

Alternatively, for example, the number of priorities of at least one of the SR, ACK/NACK, CSI, and uplink data in the PHY layer may be different from the number of logical channel priorities. In this case, terminal 200 may compare the priorities of each of the SR, ACK/NACK, CSI, and uplink data in the PHY layer data based on a criterion different from the logical channel priorities. In the criterion in the PHY layer, the priority of the uplink signal may be determined, for example, in association with the logical channel priority. The association between the priority of the uplink signal and the logical channel priority may be indicated by base station 100 to terminal 200 by RRC, for example, or may be predefined in the specifications.

The priorities of SR, ACK/NACK, CSI, and uplink data in the PHY layer may be the same or different from one another. When the number of priorities differs between UCIs or between UCI and uplink data, the association between the different numbers of priorities may be configured for terminal 200, e.g., by RRC, or may be predefined in the specifications.

According to one exemplary embodiment of the present disclosure, terminal 200 can determine the priorities between different UCIs or pieces of data based on the priority of each of the UCIs and the pieces of uplink data in the PHY layer, even when transmissions of a plurality of uplink signals (e.g., UCI or uplink data) overlap one another in the time domain.

(Variation 1 of Terminal Operation 2)

By way of example, above-described terminal operation 1 has been described in relation to the case where the priorities of each of the ACK/NACK and CSI are associated with a plurality of logical channel priorities (or priorities of another UCI) (see, for example, FIGS. 15 and 18). In this case, for example, in terminal operation 2, terminal 200 may compare, with the priority of another uplink signal, the priority of any one of the plurality of logical channels associated with an ACK/NACK or CSI priority. For example, in FIG. 15, when indicated by priority indicator="0," terminal 200 may configure priority 2 the highest among logical channel priorities 2 to 7 corresponding to priority indicator="0" to the ACK/NACK priority in terminal operation 2 and compare the priority with the priority of the other uplink signal.

Note that, of the plurality of logical channel priorities associated with UCI priorities in the PHY layer, a priority serving as a standard (in other words, a priority with which comparison is to be performed) in the PHY is not limited to the highest priority, and may be any one of the priorities.

(Variation 2 of Terminal Operation 2)

Further, it is assumed that examples of the case where the transmissions of a plurality of uplink signals overlap one another in the time domain include a case where a plurality of UCIs overlap one another in the time domain, and resources for both or one of the plurality of UCIs overlap with a resource for uplink data in the time domain.

In this case, for example, terminal 200 first compares the priorities between the UCIs and determines the UCI to be transmitted by below-described terminal operation 3. Next, when the resource for the determined UCI and the resource for the uplink data overlap one another in the time domain, terminal 200 may compare priorities between the UCI and the uplink data to determine an uplink signal to be actually transmitted by terminal operation 3 described later.

The uplink signal actually transmitted by terminal 200 may be generated, for example, by applying a method of dropping a low-priority signal and transmitting a high-priority signal (e.g., also referred to as "Prioritization"), or a method of multiplexing and transmitting a plurality of uplink signals in one channel (e.g., PUCCH or PUSCH) (e.g., "Multiplexing"). In other words, as a result of terminal operation 2 and terminal operation 3 performed between the UCIs, a plurality of uplink signals may be multiplexed in the uplink signal actually transmitted by terminal 200. In this case, in terminal 200, the priority of the UCI to be compared with the uplink data may be the priority of the UCI having the highest priority among the multiplexed UCIs, or may be another priority.

Further, as described above, the processing of terminal 200 is not limited to the processing of comparing the priorities between the UCI and the uplink data after comparing the priorities between the UCIs. For example, when a plurality of UCIs overlap one another in the time domain and the resources for both or one of the plurality of UCIs overlap with the resource for the uplink data in the time domain, terminal 200 may compare (e.g., collectively compare) the priorities of the plurality of UCIs with the uplink data to determine an uplink signal to be actually transmitted.

Terminal operation 2 has been described above.

[Terminal Operation 3]

In terminal operation 3, terminal 200 determines an uplink signal to be actually transmitted based on the priorities of a plurality of uplink signals determined in terminal operation 2.

Figure 22:
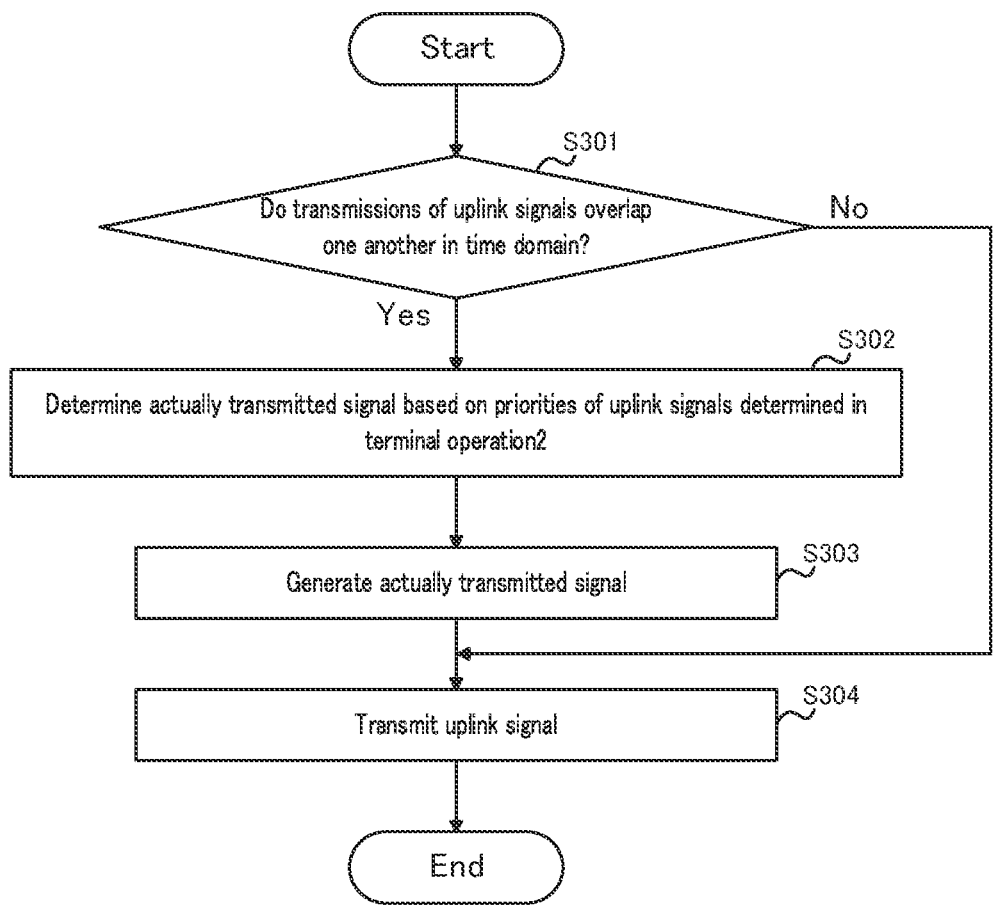
FIG. 22 is a flowchart illustrating an operation example of the terminal according to terminal operation 3.

FIG. 22 is a flowchart illustrating an operation example relating to terminal operation 3 in terminal 200.

Terminal 200, for example, determines whether or not transmissions of a plurality of uplink signals (e.g., UCI or uplink data) overlap one another in the time domain (S301). When the transmissions of a plurality of uplink signals do not overlap one another in the time domain (S301: No), terminal 200 performs below-described processing at S304.

When the transmissions of the plurality of uplink signals overlap one another in the time domain (S301: Yes), terminal 200 determines, for example, based on the priorities of a plurality of uplink signals determined in terminal operation 2, an uplink signal to be actually transmitted (S302).

Terminal 200 generates the uplink signal to be actually transmitted (S303). The uplink signal actually transmitted by terminal 200 may be generated by applying Prioritization or Multiplexing, for example.

Then, terminal 200 transmits the generated uplink signal (S304).

For example, the methods described below with respect to Prioritization and Multiplexing (any of Options 1 to 3) can be applied.

<Option 1>

When the priorities of subject uplink signals in the PHY layer are different from one another, terminal 200 determines that an uplink signal having a lower priority among a plurality of uplink signals is not to be transmitted (in other words, is to be dropped). For example, terminal 200 drops a signal having a lower priority among two uplink signals having different priorities, and transmits a signal having a higher priority.

On the other hand, when the priorities of the subject uplink signals in the PHY layer are the same, terminal 200 may apply, for example, the terminal operation in NR Release 15 described above (see, for example, NPL 5).

According to Option 1, when a resource for transmitting the UCI (e.g., SR, ACK/NACK or CSI) or uplink data, for example, for URLLC having a higher priority as compared with other services overlaps in the time domain with other uplink transmissions (e.g., UCI or uplink data), terminal 200 can actually transmit the higher priority uplink signal.

<Option 2>

When the priorities of subject uplink signals in the PHY layer are different from one another, terminal 200 drops a low-priority signal and transmits a high-priority signal as in Option 1.

Further, when the priorities of subject uplink signals in the PHY layer are the same, one of a plurality of uplink signals is determined not to be transmitted (in other words, determined to be dropped). For example, terminal 200 drops one of two uplink signals having the same priority, and transmits the other signal.

According to Option 2, terminal 200 transmits one uplink signal without multiplexing a plurality of uplink signals even when the priorities of the uplink signals in the PHY layer are the same. It is thus possible to simplify the processing of terminal 200.

<Option 3>

Terminal 200 transmits UCI or uplink data having a higher priority and, when a condition is satisfied, multiplexes and transmits UCI or uplink data having a lower priority in the channel in which the UCI or uplink data having the higher priority is transmitted. For example, terminal 200 multiplexes two uplink signals on a transmission resource used for transmitting an uplink signal having a higher priority between the two uplink signals having different priorities.

The condition for multiplexing transmissions of a plurality of uplink signals may be, for example, a case where there is room in uplink resources (e.g., a case where the amount of resources or the remainder of resources is equal to or greater than a threshold), or may also be another condition.

According to Option 3, for example, when there is room in resources, terminal 200 can multiplex and transmit a plurality of uplink signals as many as possible. It is thus possible to improve the resource utilization efficiency (in other words, transmission efficiency).

In other words, for example, when there is no room in the resources, terminal 200 does not perform multiplexing transmission of a plurality of uplink signals. Terminal 200 can, for example, transmit a part of the uplink signals and drop the other uplink signals. By not performing multiplexing transmission of a plurality of uplink signals, it is possible to suppress degradation of the transmission efficiency that might be caused due to, for example, transmission of URLLC traffic on a resource corresponding to eMBB (in other words, a resource that does not satisfy URLLC requirements). In addition, it is possible to suppress degradation of the transmission efficiency that might be caused due to multiplexing between UCIs with respect to eMBB traffic in a resource corresponding to URLLC.

In the following, examples of terminal operations 3 (e.g., including Options 1 to 3) in scenarios in which transmissions of a plurality of uplink signals (SR. ACK/NACK, CSI, and uplink data) overlap one another in the time domain will be described.

[SR vs ACK/NACK]

When a transmission resource (e.g., PUCCH) for an SR and a transmission resource (e.g., PUCCH) for ACK/NACK overlap one another in the time domain, terminal 200 determines, for example, the priority of the triggered SR in the PHY layer and the ACK/NACK priority based on terminal operation 1, and compares the SR priority and the ACK/NACK priority in the PHY layer based on terminal operation 2.

Then, terminal 200 determines a signal to be actually transmitted by one of the following methods of terminal operation 3 based on the result of comparing the SR and ACK/NACK priorities.

<Option 1>

When the SR and ACK/NACK priorities in the PHY layer are different from each other, terminal 200 drops (in other words, does not transmit) one of the SR and ACK/NACK which has a lower priority and transmits the other of the ACK/NACK and SR which has a higher priority. On the other hand, when the SR and ACK/NACK priorities in the PHY layer are the same, terminal 200 may apply the above-described NR Release 15 terminal operation (see, for example, NPL 5).

<Option 2>

When the SR and ACK/NACK priorities in the PHY layer are different from each other, terminal 200 drops (in other words, does not transmit) one of the SR and ACK/NACK which has a lower priority and transmits the other of the ACK/NACK and SR which has a higher priority. On the other hand, when the SR and ACK/NACK priorities in the PHY layer are the same, terminal 200 may apply any of the following methods of Option 2-1 and Option 2-2.

Option 2-1:

Terminal 200 drops the SR and transmits the ACK/NACK. For example, when the relative importance of priority placed on the downlink is greater than that on the uplink, the ACK/NACK priority corresponding to downlink data can be made higher than the SR priority corresponding to uplink data by the operation of Option 2-1.

Option 2-2:

Terminal 200 drops the ACK/NACK and transmits the SR. For example, when the relative importance of priority placed on the uplink is greater than that on the downlink, the SR priority corresponding to uplink data can be made higher than the ACK/NACK priority corresponding to downlink data by the operation of Option 2-2.

<Option 3>

When the SR and ACK/NACK priorities in the PHY layer are different from each other, terminal 200 drops (in other words, does not transmit) one of the SR and ACK/NACK which has a lower priority and transmits the other of the ACK/NACK and SR which has a higher priority.

On the other hand, when the SR and ACK/NACK priorities in the PHY layer are the same, terminal 200 may multiplex and transmit the SR and ACK/NACK in the PUCCH under a certain condition.

The condition for multiplexing transmission of the SR and ACK/NACK may be, for example, a condition utilizing the information (e.g., priority information) for determining the ACK/NACK priority that can be indicated by the information included in the DL assignment (or DCI) or the parameters of the DCI. For example, when the ACK/NACK priority corresponds to information "0" for determining the ACK/NACK priority indicated by the DCI, terminal 200 may multiplex and transmit the SR and the ACK/NACK in the PUCCH. On the other hand, for example, when the ACK/NACK priority corresponds to information "1" for determining the ACK/NACK priority indicated by the DCI, terminal 200 may drop the ACK/NACK.

Conversely, terminal 200 may, for example, drop the SR when the priority level of the ACK/NACK corresponds to information "0" for determining the ACK/NACK priority indicated by the DCI, and multiplex and transmit the SR and the ACK/NACK in the PUCCH when the priority level of the ACK/NACK corresponds to information "1" for determining the ACK/NACK priority indicated by the DCI.

Note that, the condition for multiplexing transmission of the SR and the ACK/NACK in the PUCCH is not limited to the above. The condition may be, for example, a condition utilizing information such as a transmission timing for the PUCCH that transmits the SR or ACK/NACK, the number of transmission symbols of the PUCCH, and the maximum coding rate configured for the PUCCH.

In addition, terminal 200 may switch between possibility and impossibility of multiplexing transmission of the SR and ACK/NACK based on a configuration (in other words, an indication) by base station 100.

<Option 4>

When the transmission resource (e.g., PUCCH) for the SR and the transmission resource (e.g., PUCCH) for the ACK/NACK overlap one another in the time domain, not only Option 1. Option 2, and Option 3 described above but also Option 4 described below may be applied.

In Option 4, terminal 200 may, for example, prioritize the priorities of the SR and ACK/NACK based on parameters of transmission resources for the SR and ACK/NACK in the PHY layer.

For example, when the SR and ACK/NACK priorities in the PHY layer are different from each other, terminal 200 drops (in other words, does not transmit) one of the SR and ACK/NACK which has a lower priority and transmits the other of the ACK/NACK and SR which has a higher priority.

On the other hand, when the SR and ACK/NACK priorities in the PHY layer are the same, terminal 200 may further prioritize the SR and ACK/NACK priorities based on the parameters of the transmission resources for the SR or ACK/NACK in the PHY layer. The parameters used for prioritizing the priorities may be, for example, at least one of PUCCH formats, the number of symbols of the PUCCH, and the periodicity of the SR. For example, of the PUCCH formats, a Short PUCCH may be configured to have a higher priority than a Long PUCCH. Further, for example, regarding the numbers of symbols of the PUCCH, the smaller the number of symbols, the higher the priority may be configured. Further, when the periodicity of the SR is shorter than a threshold, the priority may be configured higher than when the periodicity of the SR is equal to or longer than the threshold. Note that, the parameters utilized for prioritizing the priorities are not limited to these parameters and may be other parameters.

According to Option 4, the priorities of the SR and ACK/NACK can be made more definite in terminal 200.

[Variation 1 of SR vs ACK/NACK]

In NR Release 15, for example, as described above, when a PUCCH resource configured for transmitting the SR using PUCCH format 0 and a PUCCH resource configured for transmitting the ACK/NACK using PUCCH format 1 overlap one another in the time domain, the terminal drops the transmission of the SR and transmits the ACK/NACK using a PUCCH assigned for the ACK/NACK.

In terminal operation 3 in this case, terminal 200 may apply a terminal operation different from that of NR Release 15.

For example, terminal 200 may drop transmission of NACK and transmit the SR when the ACK/NACK is NACK. On the other hand, when the ACK/NACK is ACK, terminal 200 may multiplex and transmit the SR and ACK. Base station 100 may judges the SR and ACK/NACK (ACK or NACK) based on the PUCCH resources (e.g., parameters such as a cyclic shift amount) in which the signals are detected.

According to Variation 1, terminal 200 does not have to drop the SR but can transmit the SR even when the PUCCH resource configured for transmitting the SR using PUCCH format 0 and the PUCCH resource configured for transmitting the ACK/NACK using PUCCH format 1 overlap one another in the time domain. The transmission of the SR can lead to, for example, reduction of the delay of the uplink data.

[Variation 2 of SR vs ACK/NACK]

In NR Release 15, for example, as described above, when a PUCCH resource configured for transmitting the SR using PUCCH format 0 and a PUCCH resource configured for transmitting the ACK/NACK using PUCCH format 1 overlap one another in the time domain, the terminal drops the transmission of the SR and transmits the ACK/NACK using a PUCCH assigned for the ACK/NACK.

In this case, terminal 200 may apply a terminal operation different from that of NR Release 15 in terminal operation 3.

For example, regarding PUCCH format 0 for transmitting the SR that is composed of 12 subcarriers, terminal 200 may modulate a part of the subcarriers by the ACK/NACK to transmit the SR. Base station 100 may, for example, use a subcarrier not modulated by the ACK/NACK as a demodulation reference signal and demodulate the subcarrier modulated by the ACK/NACK after the channel estimation is performed.

According to Variation 2, even when the transmission resource for the SR and the transmission resource for the ACK/NACK overlap one another in the time domain, terminal 200 can transmit both the SR and ACK/NACK by modulating, using the ACK/NACK, a subcarrier in the PUCCH resource configured for transmitting the SR using PUCCH format 0. It is thus possible for terminal 200 to not drop the SR but to transmit the SR, so as to reduce, for example, the delay of the uplink data.

[Variation 3 of SR vs ACK/NACK]

When a transmission resource (e.g., PUCCH) for the SR and a transmission resource (e.g., PUCCH) for the ACK/NACK overlap one another in the time domain, terminal 200 may apply a terminal operation in which either the SR or ACK/NACK is dropped.

When the SR is dropped, terminal 200 waits to transmit the SR until the next transmission timing for the SR. Accordingly, a delay may occur in the uplink.

Further, when the ACK/NACK is dropped, base station 100 cannot identify a reception result (error detection result) for a PDSCH at terminal 200. In this case, base station 100 transmits the PDSCH again. Thus, the resource utilization efficiency decreases.

In view of the above, Variation 3 will be described in relation to an operation example of terminal 200 and base station 100 that is performed when either the SR or ACK/NACK is dropped and that takes into account the delay of the SR transmission or the resource utilization efficiency.

<Variation 3-1>

When the transmission resource (e.g., PUCCH) for the SR and the transmission resource (e.g., PUCCH) for the ACK/NACK overlap one another in the time domain, terminal 200 drops the transmission of the SR and transmits the ACK/NACK. In this case, base station 100 determines that the SR is to be transmitted from terminal 200, and may assign terminal 200 an uplink resource for BSR transmission, for example.

When having actually dropped the transmission of the SR, terminal 200 transmits the BSR and the uplink data in the uplink resource assigned by base station 100. On the other hand, when having not actually dropped the transmission of the SR (e.g., when the transmission of the SR has not occurred), for example, terminal 200 may transmit a Padding BSR in the uplink resource assigned by base station 100.

In Variation 3-1, even when terminal 200 actually drops the transmission of the SR, terminal 200 can transmit the BSR without waiting to transmit the SR until the next SR transmission timing. It is thus possible to reduce the delay.

<Variation 3-2>

When the transmission resource (e.g., PUCCH) for the SR and the transmission resource (e.g., PUCCH) for the ACK/NACK overlap one another in the time domain, terminal 200 drops the transmission of the SR and transmits the ACK/NACK. In this case, in terminal 200, the PHY layer may indicate the MAC layer of the drop of the SR. The indication of drop of the SR allows the MAC layer of terminal 200 to recognize that the SR that the MAC layer instructed the PHY layer to transmit is not actually transmitted.

<Variation 3-3>

When the transmission resource (e.g., PUCCH) for the SR and the transmission resource (e.g., PUCCH) for the ACK/NACK overlap one another in the time domain, terminal 200 drops the transmission of the ACK/NACK and transmits the SR. In this case, base station 100 may determine that decoding of ACK/NACK from terminal 200 has failed and request terminal 200 to retransmit the ACK/NACK.

According to Variation 3-3, base station 100 requests retransmission of ACK/NACK without retransmitting a PDSCH. It is thus possible to suppress the reduction in resource utilization efficiency.

[SR vs CSI]

When a transmission resource (e.g., PUCCH) for an SR and a transmission resource (e.g., PUCCH or PUSCH) for CSI overlap one another in the time domain, terminal 200 determines, for example, the priority of the triggered SR in the PHY layer and the CSI priority based on terminal operation 1, and compares the SR priority and the CSI priority in the PHY layer based on terminal operation 2.

Then, terminal 200 determines a signal to be actually transmitted by one of the following methods of terminal operation 3 based on the result of comparing the SR and CSI priorities.

<Option 1>

When the SR and CSI priorities in the PHY layer are different from each other, terminal 200 drops (in other words, does not transmit) one of the SR and CSI which has a lower priority and transmits the other of the CSI and SR which has a higher priority. On the other hand, when the SR and CSI priorities in the PHY layer are the same, terminal 200 may apply the above-described NR Release 15 terminal operation (see, for example, NPL 5).

<Option 2>

When the SR and CSI priorities in the PHY layer are different from each other, terminal 200 drops (in other words, does not transmit) one of the SR and CSI which has a lower priority and transmits the other of the CSI and SR which has a higher priority. On the other hand, when the SR and CSI priorities in the PHY layer are the same, terminal 200 may apply any of the following methods of Option 2-1 and Option 2-2.

Option 2-1:

Terminal 200 drops the SR and transmits the CSI. For example, when the relative importance of priority placed on the downlink is greater than that on the uplink, the CSI priority corresponding to downlink data can be made higher than the SR priority corresponding to uplink data by the operation of Option 2-1.

Option 2-2:

Terminal 200 drops the CSI and transmits the SR. For example, when the relative importance of priority placed on the uplink is greater than that on the downlink, the SR priority corresponding to uplink data can be made higher than the CSI priority corresponding to downlink data by the operation of Option 2-2.

<Option 3>

When the SR and CSI priorities in the PHY layer are different from each other, terminal 200 drops (in other words, does not transmit) one of the SR and CSI which has a lower priority and transmits the other of the CSI and SR which has a higher priority.

On the other hand, when the SR and CSI priorities in the PHY layer are the same, terminal 200 may multiplex and transmit the SR and CSI under a certain condition.

The condition for multiplexing the SR and the CSI may be, for example, a condition that utilizes information on the CSI priority when the CSI has a plurality of priorities (e.g., CSI priority 1 and CSI priority 2). For example, terminal 200 may multiplex the SR and the CSI when the CSI priority corresponds to CSI priority 1, and may drop the CSI when the CSI priority corresponds to CSI priority 2.

Conversely, terminal 200 may drop the SR when the CSI priority corresponds to CSI priority 1, and may multiplex and transmit the SR and CSI when the CSI priority corresponds to CSI priority 2.

Note that, the condition for multiplexing transmission of the SR and the CSI in the PUCCH is not limited to the above. The condition may be, for example, a condition utilizing information such as a transmission timing for the PUCCH that transmits the SR or CSI, the number of transmission symbols of the PUCCH, transmission periodicity, and the maximum coding rate configured for the PUCCH.

In addition, terminal 200 may switch between possibility and impossibility of multiplexing transmission of the SR and CSI based on a configuration (in other words, an indication) by base station 100.

[SR vs PUSCH]

When a transmission resource (e.g., PUCCH) for an SR and a transmission resource (e.g., PUSCH) for uplink data overlap one another in the time domain, terminal 200 determines, for example, the priority of the triggered SR in the PHY layer and the PUSCH priority based on terminal operation 1, and compares the SR priority and the PUSCH priority in the PHY layer based on terminal operation 2.

Then, terminal 200 determines a signal to be actually transmitted by the following method of terminal operation 3 based on the result of comparing the SR and PUSCH priorities.

<Option 1>

When the SR and PUSCH priorities in the PHY layer are different from each other, terminal 200 drops (in other words, does not transmit) one of the SR and PUSCH which has a lower priority and transmits the other of the PUSCH and SR which has a higher priority. On the other hand, when the SR and PUSCH priorities in the PHY layer are the same, terminal 200 may apply the above-described NR Release 15 terminal operation (see, for example, NPL 5).

[Variation of SR vs PUSCH]

When the transmission resources (e.g., PUCCH) for the SR and the transmission resource (e.g., PUSCH) for the uplink data overlap one another in the time domain, terminal 200 may apply a terminal operation in which the SR is dropped.

When the SR is dropped, terminal 200 waits to transmit the SR until the next transmission timing for the SR. Accordingly, a delay may occur in the uplink.

In this regard, the present variation will be described in relation to an operation example of terminal 200 and base station 100 that is performed in consideration of the delay of SR transmission caused when SR is dropped.

<Variation 1-1 of SR Vs PUSCH>

When the transmission resource (e.g., PUCCH) for the SR and a PUCCH overlap one another in the time domain, terminal 200 drops the transmission of the SR and transmits a PUSCH signal. In this case, base station 100 determines that the SR is to be transmitted from terminal 200, and may assign terminal 200 an uplink resource for BSR transmission, for example.

When having actually dropped the transmission of the SR, terminal 200 transmits the BSR and the uplink data in the uplink resource assigned by base station 100. On the other hand, when having not actually dropped the transmission of the SR (e.g., when the transmission of the SR has not occurred), for example, terminal 200 may transmit a Padding BSR in the uplink resource assigned by base station 100.

In Variation 1-1, even when terminal 200 actually drops the transmission of the SR, terminal 200 can transmit the BSR without waiting to transmit the SR until the next SR transmission timing. It is thus possible to reduce the delay.

<Variation 1-2 of SR Vs PUSCH>

When the transmission resource (e.g., PUCCH) for the SR and a PUSCH overlap one another in the time domain, terminal 200 drops the transmission of the SR and transmits the PUSCH. In this case, in terminal 200, the PHY layer may indicate the MAC layer of the drop of the SR. The indication of drop of the SR allows the MAC layer of terminal 200 to recognize that the SR that the MAC layer instructed the PHY layer to transmit is not actually transmitted.

[ACK/NACK Vs CSI]

When a transmission resource (e.g., PUCCH) for an ACK/NACK and a transmission resource (e.g., PUCCH or PUSCH) for CSI overlap one another in the time domain, terminal 200 determines, for example, the ACK/NACK priority in the PHY layer and the CSI priority based on terminal operation 1, and compares the ACK/NACK priority and the CSI priority in the PHY layer based on terminal operation 2.

Then, terminal 200 determines a signal to be actually transmitted by one of the following methods of terminal operation 3 based on the result of comparing the ACK/NACK and CSI priorities.

<Option 1>

When the ACK/NACK and CSI priorities in the PHY layer are different from each other, terminal 200 drops (in other words, does not transmit) one of the ACK/NACK and CSI which has a lower priority and transmits the other of the CSI and ACK/NACK which has a higher priority. On the other hand, when the ACK/NACK and CSI priorities in the PHY layer are the same, terminal 200 may apply the above-described NR Release 15 terminal operation (see, for example, NPL 5).

<Option 2>

When the ACK/NACK and CSI priorities in the PHY layer are different from each other, terminal 200 drops (in other words, does not transmit) one of the ACK/NACK and CSI which has a lower priority and transmits the other of the CSI and ACK/NACK which has a higher priority. On the other hand, when the ACK/NACK and CSI priorities in the PHY layer are the same, terminal 200 may apply any of the following methods of Option 2-1 and Option 2-2.

Option 2-1: Terminal 200 drops the ACK/NACK and transmits the CSI.

Option 2-2: Terminal 200 drops the CSI and transmits the ACK/NACK.

<Option 3>

When the ACK/NACK and CSI priorities in the PHY layer are different from each other, terminal 200 drops (in other words, does not transmit) one of the ACK/NACK and CSI which has a lower priority and transmits the other of the CSI and ACK/NACK which has a higher priority.

On the other hand, when the ACK/NACK and CSI priorities in the PHY layer are the same, terminal 200 may multiplex and transmit the ACK/NACK and CSI under a certain condition.

The condition for multiplexing transmission of the ACK/NACK and CSI may be, for example, a condition utilizing the information (e.g., priority information) for determining the ACK/NACK priority that can be indicated by the information included in the DL assignment (or DCI) or the parameters of the DCI. For example, when the ACK/NACK priority corresponds to information "0" for determining the ACK/NACK priority indicated by the DCI, terminal 200 may multiplex and transmit the ACK/NACK and CSI in the PUCCH. On the other hand, for example, when the ACK/NACK priority level corresponds to information "1" for determining the ACK/NACK priority indicated by the DCI, terminal 200 may drop the ACK/NACK.

Conversely, terminal 200 may, for example, drop the CSI when the priority level of the ACK/NACK corresponds to information "0" for determining the ACK/NACK priority indicated by the DCI, and multiplex and transmit the ACK/NACK and CSI in the PUCCH when the priority level of the ACK/NACK corresponds to information "1" for determining the ACK/NACK priority indicated by the DCI.

Note that, the condition for multiplexing transmission of the ACK/NACK and the CSI in the PUCCH is not limited to the above. The condition may be, for example, a condition utilizing information such as a transmission timing for the PUCCH that transmits the ACK/NACK or CSI, the number of transmission symbols of the PUCCH, and the maximum coding rate configured for the PUCCH.

In addition, terminal 200 may switch between possibility and impossibility of multiplexing transmission of the ACK/NACK and CSI based on a configuration (in other words, an indication) by base station 100.

[ACK/NACK Vs PUSCH]

When a transmission resource (e.g., PUCCH) for an ACK/NACK and a transmission resource (e.g., PUCCH or PUSCH) for uplink data overlap one another in the time domain, terminal 200 determines, for example, the ACK/NACK priority in the PHY layer and the PUSCH priority based on terminal operation 1, and compares the ACK/NACK priority and the PUSCH priority in the PHY layer based on terminal operation 2.

Then, terminal 200 determines a signal to be actually transmitted by one of the following methods of terminal operation 3 based on the result of comparing the ACK/NACK and PUSCH priorities.

<Option 1>

When the ACK/NACK and PUSCH priorities in the PHY layer are different from each other, terminal 200 drops (in other words, does not transmit) one of the ACK/NACK and PUSCH which has a lower priority and transmits the other of the PUSCH and ACK/NACK which has a higher priority. On the other hand, when the ACK/NACK and PUSCH priorities in the PHY layer are the same, terminal 200 may apply the above-described NR Release 15 terminal operation (see, for example, NPL 5).

<Option 2>

When the ACK/NACK and PUSCH priorities in the PHY layer are different from each other, terminal 200 drops (in other words, does not transmit) one of the ACK/NACK and PUSCH which has a lower priority and transmits the other of the PUSCH and ACK/NACK which has a higher priority. On the other hand, when the ACK/NACK and PUSCH priorities in the PHY layer are the same, terminal 200 may apply any of the following methods of Option 2-1 and Option 2-2.

Option 2-1:

Terminal 200 drops the ACK/NACK and transmits the PUSCH. For example, when the relative importance of priority placed on the uplink is greater than that on the downlink, the uplink data (PUSCH) priority can be made higher than the ACK/NACK priority corresponding to downlink data by the operation of Option 2-1.

Option 2-2.

Terminal 200 drops the PUSCH and transmits the ACK/NACK. For example, when the relative importance of priority placed on the downlink is greater than that on the uplink, the ACK/NACK priority corresponding to downlink data can be made higher than the uplink data (PUSCH) priority by the operation of Option 2-2.

<Option 3>

When the ACK/NACK and PUSCH priorities in the PHY layer are different from each other, terminal 200 drops (in other words, does not transmit) one of the ACK/NACK and PUSCH which has a lower priority and transmits the other of the PUSCH and ACK/NACK which has a higher priority.

On the other hand, when the ACK/NACK and PUSCH priorities in the PHY layer are the same, terminal 200 may multiplex and transmit the ACK/NACK and PUSCH under a certain condition.

The condition for multiplexing transmission of the ACK/NACK and PUSCH may be, for example, a condition utilizing the information (e.g., priority information) for determining the ACK/NACK priority that can be indicated by the information included in the DL assignment (or DCI) or the parameters of the DCI. For example, when the ACK/NACK priority corresponds to information "0" for determining the ACK/NACK priority indicated by the DCI, terminal 200 may multiplex and transmit the ACK/NACK and PUSCH in the PUCCH. On the other hand, for example, when the ACK/NACK priority level corresponds to information "1" for determining the ACK/NACK priority indicated by the DCI, terminal 200 may drop the ACK/NACK.

Conversely, terminal 200 may, for example, drop the PUSCH when the priority level of the ACK/NACK corresponds to information "0" for determining the ACK/NACK priority indicated by the DCI, and multiplex and transmit the ACK/NACK and PUSCH in the PUCCH when the priority level of the ACK/NACK corresponds to information "1" for determining the ACK/NACK priority indicated by the DCI.

Note that, the condition for multiplexing transmission of the ACK/NACK and the PUSCH in the PUCCH is not limited to the above. The condition may be, for example, a condition utilizing information such as a transmission timing for the PUCCH that transmits the ACK/NACK or PUSCH, the number of transmission symbols of the PUCCH or PUSCH, and the maximum coding rate configured for the PUSCH.

In addition, terminal 200 may switch between possibility and impossibility of multiplexing transmission of the ACK/NACK and PUSCH based on a configuration (in other words, an indication) by base station 100.

The examples of terminal operations 3 in scenarios in which transmissions of a plurality of uplink signals (SR, ACK/NACK, CSI, and uplink data) overlap one another in the time domain have been described above.

Note that, the terminal operation performed when the transmission resource for the CSI (e.g., PUCCH or PUSCH) and the transmission resource for the uplink data (e.g., PUSCH) overlap one another in the time domain may be the terminal operation of "ACK/NACK vs PUSCH" described above, in which ACK/NACK is replaced with the CSI.

Above-described terminal operation 3 may also be applied to cases where the transmission resources for a plurality of uplink signals (e.g., SR and SR. ACK/NACK and ACK/NACK, CSI and CSI, or PUSCH and PUSCH) of the same uplink signal type (e.g., UCI type or uplink data) overlap one another in the time domain. For example, different priorities may be configured for a plurality of the same uplink signals depending on services having different requirements (e.g., URLLC and eMBB). Based on, for example, the priorities in the PHY layer of the plurality of the same uplink signals between which the transmission resources overlap one another in the time domain, terminal 200 may determine an uplink signal to be actually transmitted.

Terminal operation 3 has been described above.

As is understood, in the present embodiment, terminal 200 determines, based on the information on the priorities of a plurality of uplink signals (e.g., priorities in the PHY layer), at least one of the plurality of uplink signals which is to be transmitted in a certain transmission resource in the time domain, and transmits the determined uplink signal on the transmission resource.

Through the transmission processing based on the priorities, even when the transmission resources for a plurality of uplink signals overlap one another in the time domain, it is possible for terminal 200 to determine, based on the priority of each of the plurality of uplink signals, the uplink signal to be actually transmitted. For example, since terminal 200 can preferentially transmit an uplink signal having a higher priority (e.g., a signal corresponding to URLLC), it is possible to suppress an increase in delay. Therefore, according to exemplary embodiments of the present disclosure, it is possible to realize appropriate radio communication processing according to requirements.

The exemplary embodiments of the present disclosure have been described above.

Other Embodiments (1) As a result of above-described terminal operations 1, 2, and 3, there may, for example, be a case where the uplink signal actually transmitted by terminal 200 is one signal (e.g., UCI or data), a case where the uplink signal actually transmitted by terminal 200 is a plurality of UCIs, and a case where the UCI and data may be multiplexed with each other.

In addition, before eliminating the overlap in the time domain between a plurality of uplink signals to be transmitted by terminal 200 and actually transmitting an uplink signal(s), terminal 200 may receive from base station 100 information on resource collision with an uplink signal for another terminal, and may drop transmissions of the uplink signals (see, for example, NPL 10).

At this time, terminal 200 may be indicated by base station 100 of information on the priority of the uplink signal for the other terminal together with information on the resource collision with the uplink signal for the other terminal, for example. In this case, terminal 200 may compare the priority of the uplink signals to be transmitted by terminal 200 with the priority of the uplink signal transmitted by the other terminal indicated by base station 100, and determine whether or not the uplink signals can be transmitted by terminal 200.

For example, the priority of one of the uplink signals of terminal 200 compared with the information on the priority of the uplink signal for the other terminal indicated by base station 100 may be the highest among the multiplexed UCIs or pieces of data, or may be another priority.

(2) In the exemplary embodiments of the present disclosure, the downlink control channel, the downlink data channel, the uplink control channel, and the uplink data channel are not limited to the PDCCH, PDSCH, PUCCH and PUSCH, respectively, but may be control channels with other names.

(3) The services having different requirements are not limited to eMBB and URLLC, but may be other services.

(4) The parameters, such as the number of logical channel priorities and the number of uplink signal priorities in the PHY layer, illustrated in the exemplary embodiments of the present disclosure are examples and are not limited to these values and may be other values.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an exemplary embodiment of the present disclosure includes: control circuitry, which, in operation, determines at least one of a plurality of uplink signals which is to be transmitted on a transmission resource in a time domain, the at least one uplink signal being determined based on information on a priority of each of the plurality of uplink signals, and transmission circuitry, which, in operation, transmits the determined at least one uplink signal on the transmission resource.

In an exemplary embodiment of the present disclosure, at least one of the plurality of uplink signals is a scheduling request for uplink data, and the information on the priority is based on a logical channel priority corresponding to the uplink data.

In an exemplary embodiment of the present disclosure, when instructing a physical layer to transmit the scheduling request, the control circuitry indicates, in a medium access control (MAC) layer, information to the physical layer, the information indicating the logical channel priority corresponding to the uplink data.

In an exemplary embodiment of the present disclosure, the logical channel priority is associated with information on a resource used for transmission of the scheduling request.

In an exemplary embodiment of the present disclosure, a number of candidates for the priority of the at least one uplink signal and a number of candidates for the logical channel priority are different from each other.

In an exemplary embodiment of the present disclosure, at least one of the plurality of uplink signals is a scheduling request for uplink data, and the information on the priority is based on a resource used for transmission of the scheduling request.

In an exemplary embodiment of the present disclosure, at least one of the plurality of uplink signals is a response signal corresponding to downlink data, and the information on the priority is based on downlink control information.

In an exemplary embodiment of the present disclosure, the information on the priority is based on an association between a parameter in the downlink control information and a logical channel priority corresponding to the downlink data.

In an exemplary embodiment of the present disclosure, a number of candidates for the priority of the at least one uplink signal is smaller than a number of candidates for the logical channel priority.

In an exemplary embodiment of the present disclosure, at least one of the plurality of uplink signals is a signal including information indicating a downlink channel state, and the information on the priority is received using a higher layer signalling or predefined.

In an exemplary embodiment of the present disclosure, at least one of the plurality of uplink signals is uplink data, and the information on the priority is based on a logical channel priority corresponding to the uplink data.

In an exemplary embodiment of the present disclosure, the control circuitry determines that one of a first uplink signal and a second uplink signal which has the priority lower between the first uplink signal and the second uplink signal is not transmitted, the first uplink signal and the second uplink signal having the priorities different from each other.

In an exemplary embodiment of the present disclosure, the control circuitry determines that one of a first uplink signal and a second uplink signal is not transmitted, the first uplink signal having the priority the same as the second uplink signal.

In an exemplary embodiment of the present disclosure, the transmission circuitry multiplexes a first uplink signal and a second uplink signal on the transmission resource for transmission of one of the first uplink signal and the second uplink signal which has the priority higher between the first uplink signal and the second uplink signal, the first uplink signal and the second uplink signal having the priorities different from each other.

A transmission method according to an exemplary embodiment of the present disclosure includes steps performed by a terminal of: determining at least one of a plurality of uplink signals which is to be transmitted on a transmission resource in a time domain, the at least one uplink signal being determined based on information on a priority of each of the plurality of uplink signals: and transmitting the determined at least one uplink signal on the transmission resource.

The disclosure of Japanese Patent Application No. 2019-130424 dated Jul. 12, 2019 including the specification, drawings and abstract is incorporated herein by reference in its entirety.

INDUSTRIAL APPLICABILITY

An exemplary embodiment of the present disclosure is useful for mobile communication systems.

REFERENCE SIGNS LIST

100 Base station
101, 205 Controller
102 Higher control signal generator
103 Downlink control information generator
104, 206 Encoder
105, 207 Modulator
106, 208 Signal allocator
107, 209 Transmitter
108, 201 Receiver
109, 202 Extractor
110, 203 Demodulator
111, 204 Decoder
200 Terminal

The invention claimed is:

1. A terminal comprising:
control circuitry, which, in operation, determines at least one of a plurality of uplink signals which is to be transmitted on a transmission resource in a time domain, the at least one uplink signal being determined based on information on a priority of each of the plurality of uplink signals; and
transmission circuitry, which, in operation, transmits the determined at least one uplink signal on the transmission resource, wherein,
one of the plurality of uplink signals is a scheduling request for uplink data,
the information on a priority in a physical layer of the scheduling request is indicated by a higher layer signaling, the priority in the physical layer and a priority in a logical channel are independently indicated, and
a number of priority candidates of the scheduling request in the physical layer is different from a number of priority candidates in the logical channel.

2. The terminal according to claim 1, wherein
information on the transmission resource is included in the higher layer signaling.

3. The terminal according to claim 1, wherein
one of the plurality of uplink signals is a scheduling request with a large priority value in the physical layer, and another of the plurality of uplink signals is HARQ-ACK information with a small priority value indicated by downlink control information (DCI), and
when a transmission of scheduling request overlaps in the time domain with a transmission of the HARQ-ACK information, the transmission circuitry cancels the transmission of the HARQ-ACK information.

4. The terminal according to claim 3, wherein
one of the plurality of uplink signals is a scheduling request, and another of the plurality of uplink signals is HARQ-ACK information with a same priority value as the scheduling request, and
when a transmission of the scheduling request overlaps in the time domain with a transmission of the HARQ-ACK information, the transmission circuitry transmits at least the HARQ-ACK information.

5. The terminal according to claim 1, wherein
in response to uplink resource information relating to cancelation of the plurality of uplink signals, the control circuitry determines whether each of the plurality of uplink signals is canceled based on the priority of each of the plurality of uplink signals.

6. A communication method comprising:
determining at least one of a plurality of uplink signals which is to be transmitted on a transmission resource in a time domain, the at least one uplink signal being determined based on information on a priority of each of the plurality of uplink signals; and
transmitting the determined at least one uplink signal on the transmission resource, wherein
one of the plurality of uplink signals is a scheduling request for uplink data,
the information on a priority in a physical layer of the scheduling request is indicated by a higher layer signaling, the priority in the physical layer and a priority in a logical channel are independently indicated, and
a number of priority candidates of the scheduling request in the physical layer is different from a number of priority candidates in the logical channel.

7. The communication method according to claim 6, wherein
information on the transmission resource is included in the higher layer signaling.

8. The communication method according to claim 6, wherein
one of the plurality of uplink signals is a scheduling request with a large priority value in the physical layer, and another of the plurality of uplink signals is HARQ-ACK information with a small priority value indicated by downlink control information (DCI), and
the method comprises, when a transmission of the scheduling request overlaps in the time domain with a transmission of the HARQ-ACK information, canceling the transmission of the HARQ-ACK information.

9. The communication method according to claim 8, wherein
   one of the plurality of uplink signals is a scheduling request, and another of the plurality of uplink signals is HARQ-ACK information with a same priority value as the scheduling request, and
   the method comprises, when a transmission of the scheduling request overlaps in the time domain with a transmission of the HARQ-ACK information, transmitting at least the HARQ-ACK information.

10. The communication method according to claim 6, comprising:
   in response to uplink resource information relating to cancelation of the plurality of uplink signals, determining whether each of the plurality of uplink signals is canceled based on the priority of each of the plurality of uplink signals.

* * * * *